(12) United States Patent
Wood et al.

(10) Patent No.: US 6,414,673 B1
(45) Date of Patent: Jul. 2, 2002

(54) TRANSMITTER PEN LOCATION SYSTEM

(75) Inventors: Robert P. Wood, San Carlos; Jacob Harel, San Francisco; Alfred Samson Hou, Sunnyvale; Serge Plotkin, Belmont, all of CA (US)

(73) Assignee: Tidenet, Inc., Foster City, CA (US)

( * ) Notice: Subject to any disclaimer, the term of this patent is extended or adjusted under 35 U.S.C. 154(b) by 0 days.

(21) Appl. No.: 09/189,299

(22) Filed: Nov. 10, 1998

(51) Int. Cl.[7] ................................................. G09G 5/00
(52) U.S. Cl. ..................... 345/173; 345/175; 345/177; 345/179; 178/18.01
(58) Field of Search ........................... 178/19.01, 19.02, 178/18.01–18.04, 18.09, 19.07; 345/157, 158, 173–175, 177–179, 183

(56) References Cited

U.S. PATENT DOCUMENTS

| | | | | |
|---|---|---|---|---|
| 4,814,552 A | * | 3/1989 | Stefik et al. | 178/18 |
| 5,142,506 A | | 8/1992 | Edwards | 367/127 |
| 5,717,168 A | * | 2/1998 | DeBuisser et al. | 178/19 |
| 5,750,941 A | * | 5/1998 | Ishikawa et al. | 178/19 |
| 6,335,723 B1 | * | 1/2002 | Wood et al. | 345/173 |

FOREIGN PATENT DOCUMENTS

| | | | |
|---|---|---|---|
| EP | 797 105 A2 | 9/1997 | G01S/15/10 |
| GB | 2 304 190 A | 3/1997 | G01S/5/20 |
| WO | WO 98/38595 | 9/1998 | G06K/11/18 |
| WO | WO 98/39729 | 9/1998 | G06K/11/00 |

\* cited by examiner

Primary Examiner—Regina Liang

(57) ABSTRACT

A transmitter pen location system is provided, in which a pen is adapted to send a repeated output signal to external receivers at two or more receiver locations, wherein the location of the pointing tip of the pen is determined in relation to the writing surface of a whiteboard. In one embodiment an output element, preferably an ultrasonic transducer, transmits a time dependent output signal from a single signal transmitter pen to two or more external receivers at two or more receiver locations. The direction of arrival of the output signal to each of the receiver locations is determined, and the pointing tip of the single transmitter pen is then determined, as the intersection of direction vectors from the pen to the external receivers. In another embodiment, the transducer transmits a time dependent output signal from the transmitter pen to three or more external receivers, wherein the received signal is processed to determine the time of arrival to each of the receivers, and the location of the pointing tip of the pen is determined as the calculated distance between the receivers. In another alternate embodiment having a dual signal transmitter pen, a third receiver located at a receiver location is used to determine the time of arrival of a secondary output signal, to determine the distance between the dual signal transmitter pen and the receiver location, while two or more receivers at the receiver location are used to determine the direction of arrival of the primary time dependent output signal. Alternative embodiments allow the transmission of supplementary information from the transmitter pen to the receivers, using waveshaping of the output signal.

96 Claims, 16 Drawing Sheets

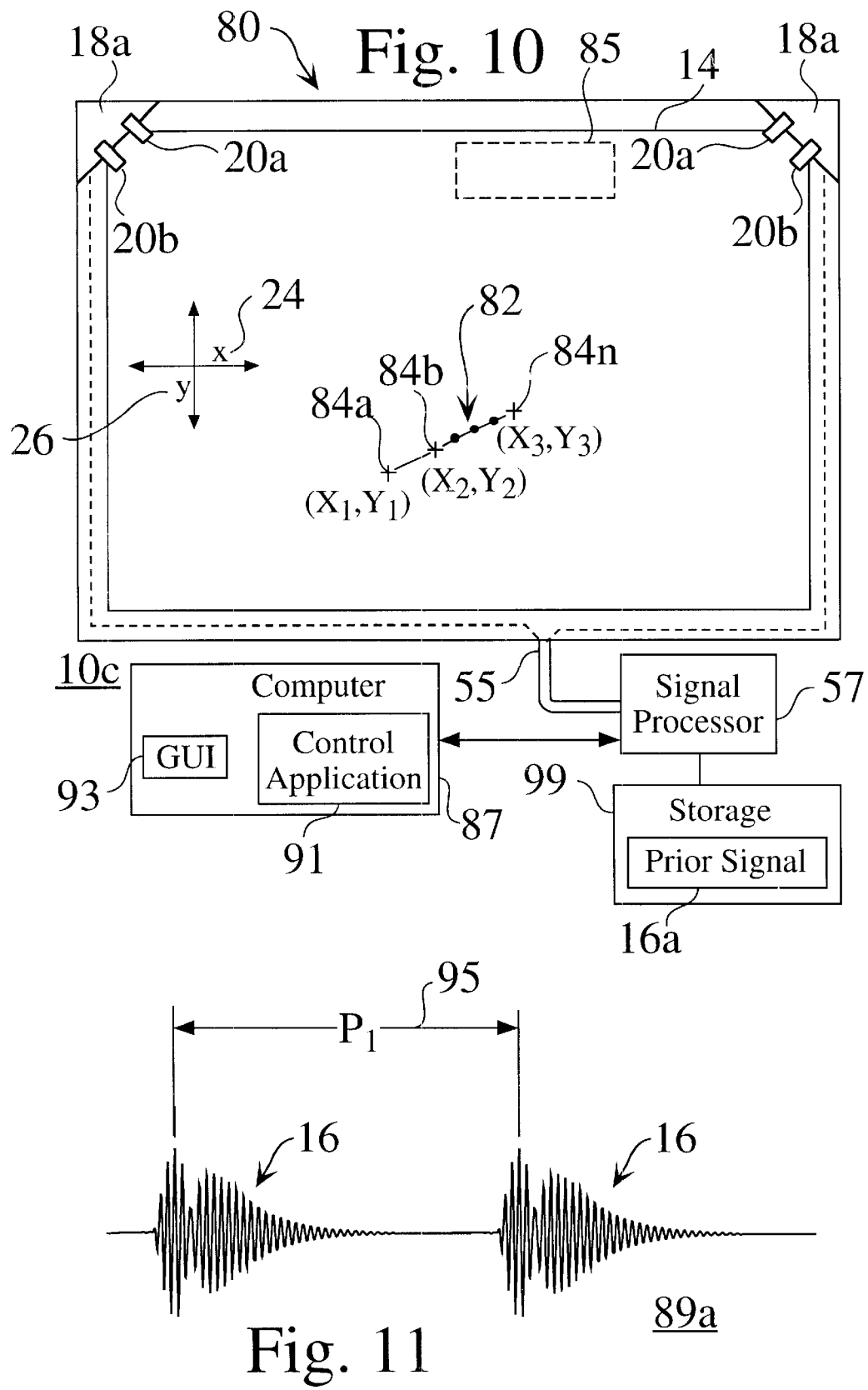

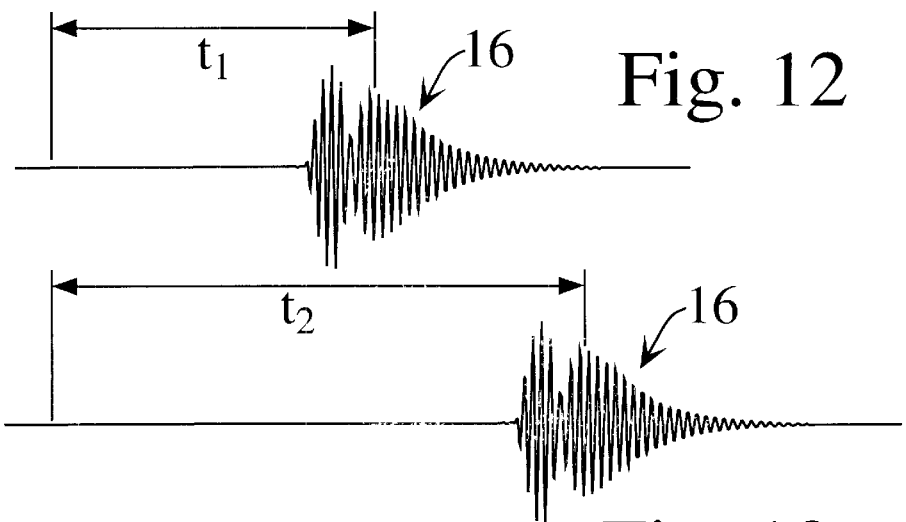
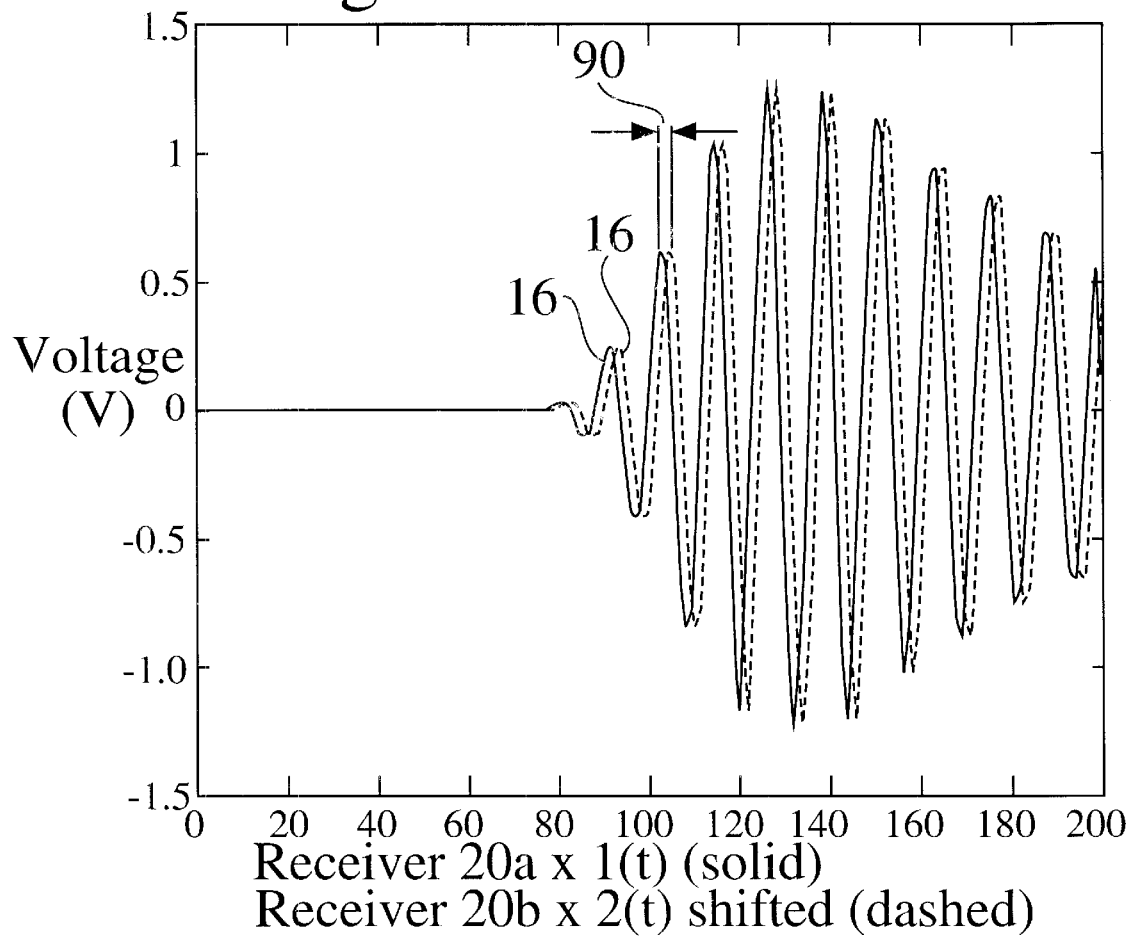

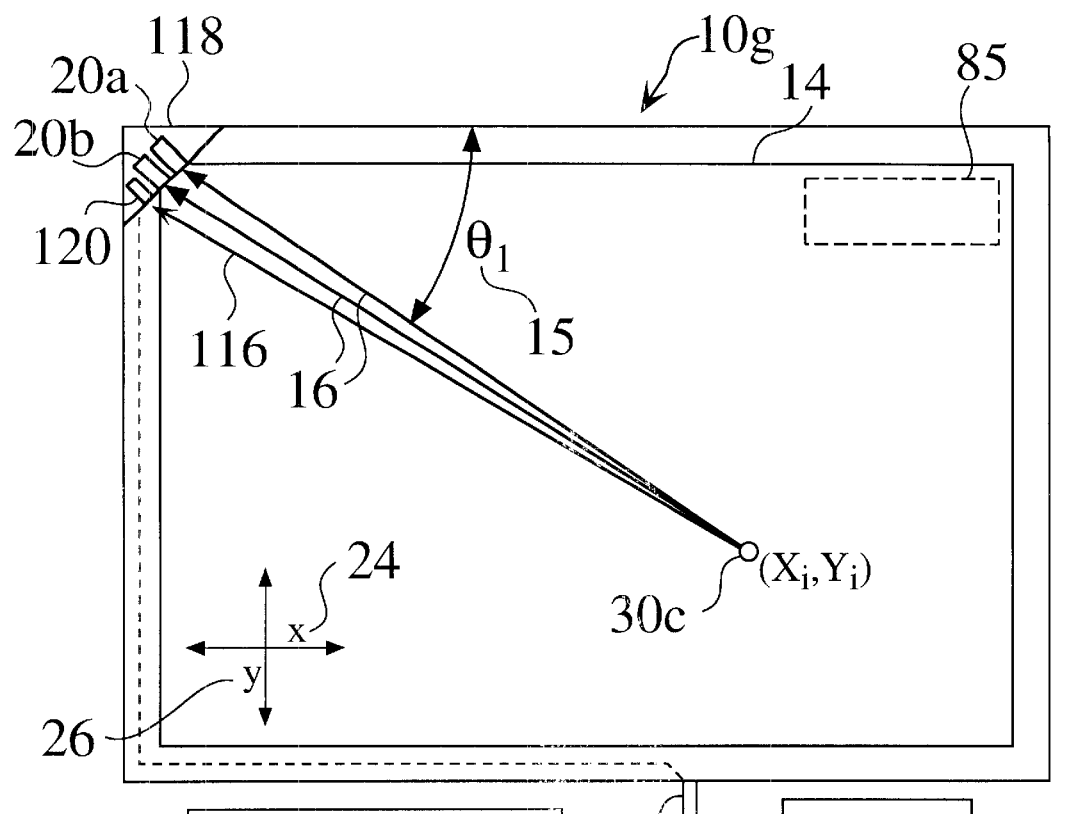
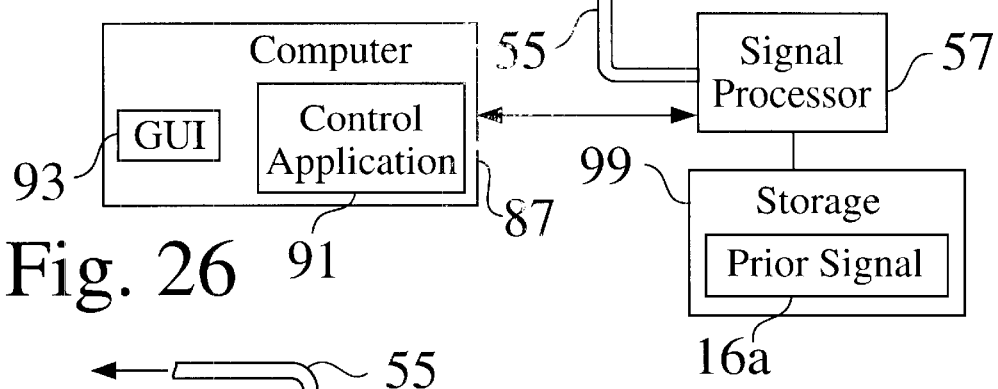
Fig. 26
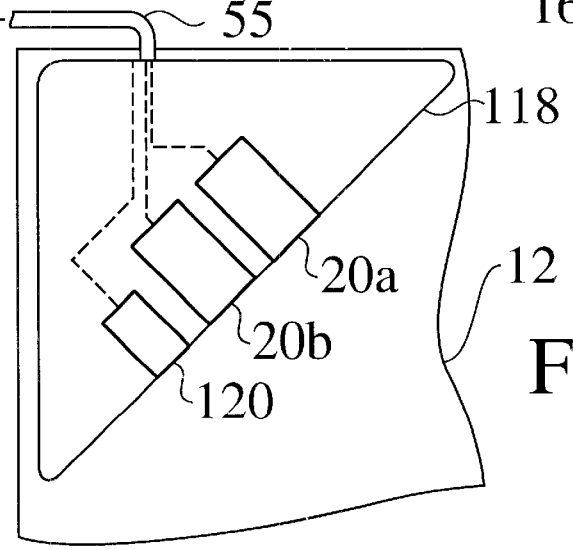
Fig. 27

TRANSMITTER PEN LOCATION SYSTEM

FIELD OF THE INVENTION

The invention relates to the field of location algorithms for remote devices. More particularly, the invention relates to an algorithm system for determining the position of an electronic pointing device.

BACKGROUND OF THE INVENTION

Digitizing pen and whiteboard systems are used for a variety of electronic applications. These systems typically include a whiteboard, a position indicating pen, and associated electronics for determining the interaction between the whiteboard and the position indicating pen. A digital data signal is typically derived to represent the relative position of the position indicating pen and the whiteboard.

When a signal, such as ultrasound, is used as a location signal for a remote device, it is often difficult to determine the location of the device accurately, since it is difficult to determine where upon each of sequential long wavepulses to measure, as a determination of the time of arrival to external receivers.

M. Stefik and C Heater, *Ultrasound Position Input Device*, U.S. Pat. No. 4,814,552 (Mar. 21, 1989) discloses an "input device, or stylus, for entering hand drawn forms into a computer using a writing instrument, a pressure switch for determining whether the instrument is in contact with the writing surface, an acoustic transmitter for triangulating the position of the stylus on the surface, and a wireless transmitter for transmitting data and timing information to the computer. In operation, the stylus transmits an infrared signal which the system receives immediately, and an ultrasound pulse which two microphones receive after a delay which is a function of the speed of sound and the distance of the stylus from the microphone". While Stefik et al. discloses an algorithm to analyze the incoming ultrasound signals to locate the stylus, the algorithm computes radii to each of the two microphones using information from only a single sonic pulse sample, translates the two radii into a calculated X,Y location, and then filters the calculated X,Y values, removing them from the described path if they vary from a specified limit, or range.

B. Edwards, *Ultrasound Position Locating Method and Apparatus Therefor*, U.S. Pat. No. 5,142,506 (Aug. 25, 1992) discloses a "positional locating method and apparatus for measuring distances by accurately determining the transit time of ultrasonic wave bursts between two or more points". "Timer clocks are started when each of the bursts is triggered to be emitted from a transmission point, and are stopped when a highly defined point in the burst is received at a corresponding receiving point. The highly defined point is determined by first analyzing the burst to identify a particular cycle within the burst. The particular cycle is then analyzed to detect the specific point within the cycle".

Analog systems, such as described by Edwards, are inherently limited to "on the fly" comparison between a current signal burst and a small amount of amplitude information from a single prior signal. Since analog systems do not store the entire prior signal bursts in memory, they are limited to the comparison of a small number of features on the last prior signal.

While Edwards typically uses multiple receivers to locate a transmitter using ordinary trigonometric calculations, the analog system is limited to the comparison of amplitude between a small number of measured peaks on successive cycles within "bursts" of the received ultrasonic waveform. Common variations of the waveform, typically due to ordinary use of a transmitter, either from the orientation of the transmitter to the receivers, the speed at which the transmitter is moved between different regions of a writing surface, the signal strength of the transmitted signal, noise, or reflections can result in erroneous results. Reliance on the amplitude of a specific cycle within a pulse waveform can lead to errors of one or more cycles, resulting in position detection errors of several centimeters. Errors in such an analog system commonly result either in an inaccurate determined location for the transmitter, or in a determined location point which is required to be "thrown out" from the described path of the movable transmitter. As well, the analog system used inherently limits the type of comparison between the amplitude of selected cycle peaks within signal "bursts" within a prior output signal and a current output signal, thus preventing the analog system to being easily adaptable to hardware embodiments or improved waveform comparison techniques.

I. Gilchrist, *Acoustic Mouse System*, U.S. Pat. No. 5,144,594 Sep. 3, 1992) discloses an acoustic mouse system, which "controls indications on an X-Y surface of the face of a display. The system comprises at least three acoustic receivers in an x-y plane, and a hand movable acoustic transmitter that is movable both parallel to the x-y plane and in a z direction perpendicular to the x-y plane. The transmitter generates periodic acoustic oscillations in the direction of the support and its receivers. Detection circuitry, responsive to the signals from the acoustic receivers, provides signals indicative of the absolute position of the acoustic transmitter in the x-y plane. A processor is responsive to the signals from the detection circuitry to provide absolute position signals to the display, whereby the display responds by moving an indication to a corresponding position on the X-Y surface of the display face. The detector circuitry is further enabled to provide z position signals to the display, whereby the display may modify a display function in accordance with the z position signals". While Gilchrist discloses a generic, periodic acoustic wavelength position indicating system, Gilchrist fails to disclose a useful algorithm by which the position of the movable acoustic transmitter is determined by the detection circuitry, either by the direction of arrival or by the time of arrival of a transmitter signal. Furthermore, the system apparently requires a minimum of three acoustic receiver locations to properly locate the movable acoustic transmitter. Gilchrist also fails to disclose waveform analysis techniques which can be used to provide sufficient accuracy in the determination of the movable acoustic transmitter.

The disclosed prior art systems and methodologies thus provide basic transmitter pen and whiteboard positioning systems for determining the spatial relationship between a pen and a writing area, but fail to provide an accurate means for determining the position of the tip of the pen. The development of such a transmitter pen positioning system would constitute a major technological advance. Furthermore, the development of such a transmitter pen positioning system which also provides a means for communicating supplementary information between a transmitter pen and external receivers would constitute a further major technological advance.

SUMMARY OF THE INVENTION

A transmitter pen location system is provided, in which a pen is adapted to send a repeated output signal to external receivers at two or more receiver locations, wherein the location of the pointing tip of the pen is determined in relation to the writing surface of a whiteboard. In one embodiment an output element, preferably an ultrasonic transducer, transmits an output signal from the transmitter pen to two or more external receivers at two or more receiver locations. The direction of arrival of the output signal to each of the receiver locations is determined, and the position of the pointing tip of the transmitter pen is then determined, as the intersection of direction vectors from the pen to the external receivers. In an alternate embodiment, the transducer transmits an output signal from the transmitter pen to three or more external receivers, wherein the received signal is processed to determine the time of arrival to each of the receivers, and the location of the pointing tip of the pen is determined as the calculated distance between the transducer and each of the receivers. In another alternate embodiment having a dual signal transmitter pen, a third receiver located at a receiver location is used to determine the time of arrival of a secondary output signal, to determine the distance between the dual signal transmitter pen and the receiver location, while two or more receivers at the receiver location are used to determine the direction of arrival of the primary output signal. Alternative embodiments allow the transmission of supplementary information from the transmitter pen to the receivers, using waveshaping of the output signal.

BRIEF DESCRIPTION OF THE DRAWINGS

FIG. 10 shows a calculated transcribed path of a single signal transmitter pen from sequential locations within the writing area of a white board;

FIG. 11 shows a periodic output signal pulse train as it is sent from a single signal transmitter pen;

FIG. 12 shows an output signal as it arrives at a first external receiver at a first receiver location;

FIG. 13 shows an output signal as it arrives at a first external receiver at a second receiver location;

FIG. 14 shows the phase difference of an output signal arriving at two external receivers, which is used by the signal processor to determine the direction of arrival of the output signal;

FIG. 26 is a top view of a combined direction and time of arrival dual-signal transmitter pen location system, in which a dual signal transmitter pen is located within the writing area of a surface;

FIG. 27 is a partial top view of a combined direction and time of arrival, dual signal receiver pod located on a surface;

DETAILED DESCRIPTION OF PREFERRED EMBODIMENTS

Figure 1:
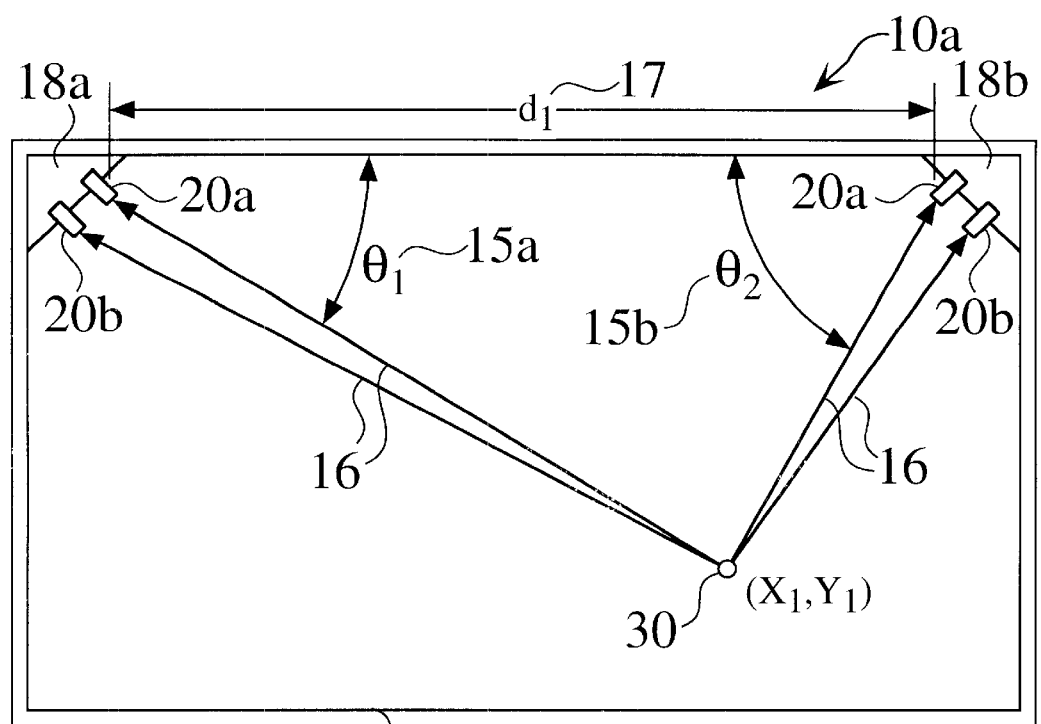
FIG. 1 is a top view of a direction of arrival transmitter pen location system, in which a single signal transmitter pen is located within the writing area of a white board, and in which the transmitter pen periodically sends an output signal to external receivers.

FIG. 1 is a top view of a single signal transmitter pen 30a located within the writing area 14 of a surface 12, in which the single signal transmitter pen 30a repeatedly sends a time dependent output signal 16 to at least two external receivers 20a, 20b at each of two receiver locations 18a and 18b. The surface 12 is typically a whiteboard, a blackboard, a drafting table, an overhead projector, a projector screen, or any kind of presentation surface. A first incline angle $\theta_1$ 15a is defined between the first receiver location 18a and the direction of transmission of the output signal 16. A second incline angle $\theta_2$ 15b is defined between the second receiver location 18b and the direction of transmission of the output signal 16.

The single signal transmitter pen 30a has a transducer element 28 (FIGS. 5–8) having an output signal 16, which is used to determine the location of the pointing tip 36 (FIGS. 5–7) of the single signal transmitter pen 30a, in relation to the writing area 14 of a surface 12 within a transmitter pen location system 10a, 10b, 10c. The output transducer 28 transmits a time dependent output signal 16 from the single signal transmitter pen 30 to the external receivers 20a, 20b at receiver locations 18a and 18b.

The output signal 16, which is repeatedly transmitted from the single signal transmitter pen 30a, typically in a periodic manner, arrives at two or more receiver locations 18, at times which are dependent on the velocity of the output signal 16 and the distance from the transmitter pen 30a to each of the receivers 20a, 20b. In one embodiment, for example, the frequency of the output signal 16 lies within the ultrasound frequency spectrum.

Figure 7:
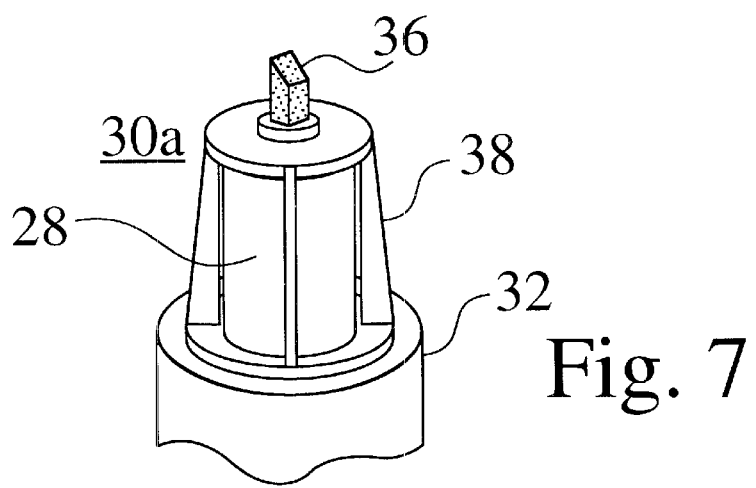
FIG. 7 is a partial perspective view of the pointing tip of a single signal transmitter pen having a single output signal transducer.
Figure 8:
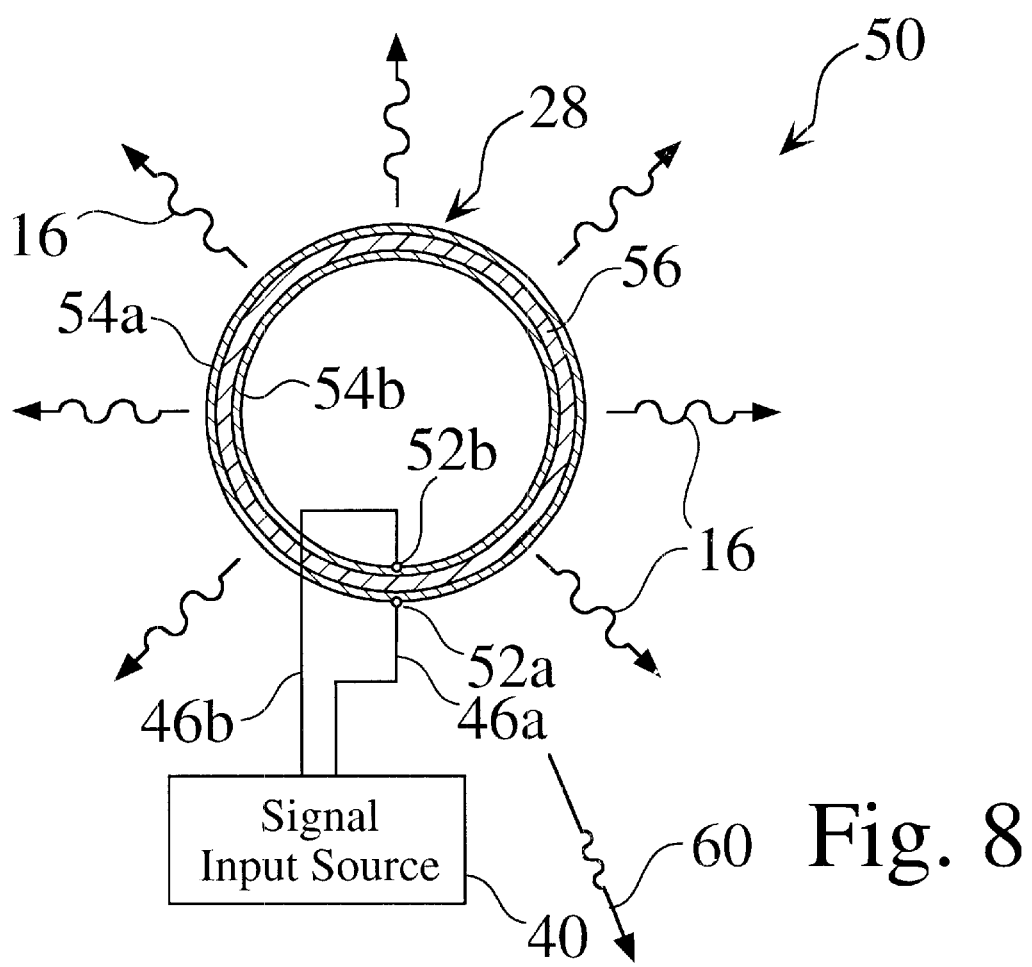
FIG. 8 is schematic view of the transmission of an output signal from a single signal transmitter pen.

When an output signal 16 arrives at each of the receivers 20a, 20b, the signal 16 is sampled by the signal processor. 57 (FIG. 8), such as by an A/D converter at either the receiver locations 18a, 18b or the signal processor 57. The sampled signal 16 is then transferred to the signal processor 57 (FIG. 8). The location of the pointing tip 36 (FIGS. 5–7) of the transmitter pen 30 is then determined by the signal processor 57, by measuring the relative phase difference of the output signal 16 between external receivers 20a, 20b at each receiver location 18a, 18b, using the difference in the phase of the arriving output signal 16 at each receiver 20a and 20b to determine the direction of arrival 15a, 15b of the output signal 16 to each of the receiver locations 18a, 18b, and then by determining the location of the single signal transmitter pen 30a, based on the simultaneous calculated directions 15a, 15b to each of the receiver locations 18a, 18b.

Figure 2:
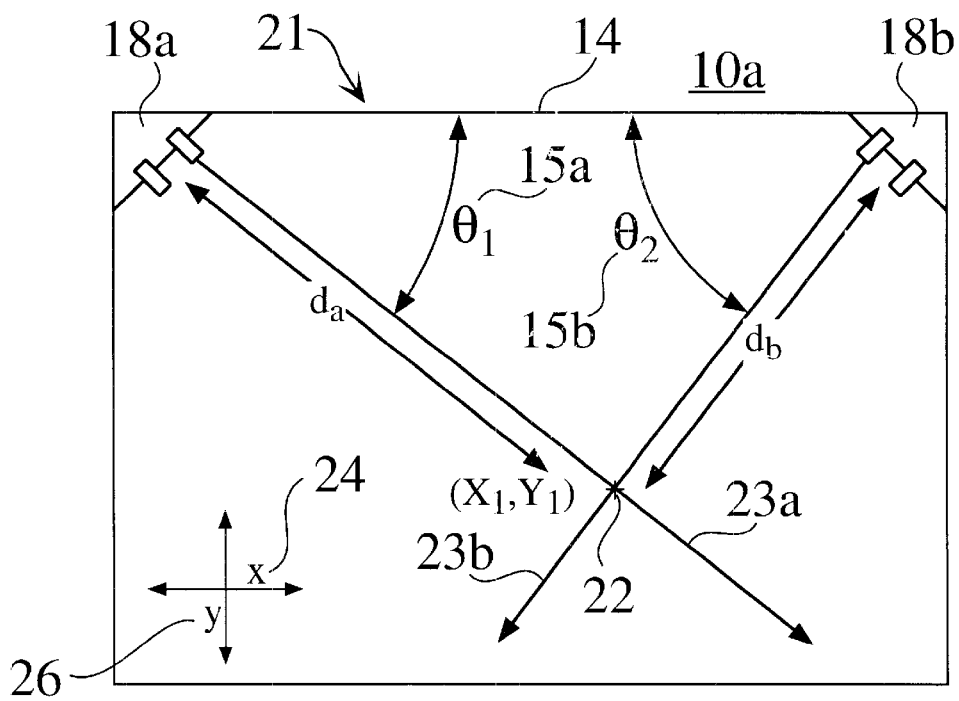
FIG. 2 shows the geometric relationship between a single signal transmitter pen and two external receiver locations.

FIG. 2 shows the geometric relationship 21 between a single signal transmitter pen 30a and two external receivers 18, with the calculated ($X_1, Y_1$) position 22 of the single signal transmitter pen 30a represented in relation to an X-axis 24 and a Y-axis 26. The distance $d_a$ between the first receiver location 18a and the calculated ($X_1, Y_1$) position 22 is defined along direction vector 23a. The distance $d_b$ between the second external receiver location 18b and the calculated ($X_1, Y_1$) position 22 is defined along direction vector 23b. The ($X_1, Y_1$) position 22 of the single signal transmitter pen 30a is shown, and is calculated, as the intersection 22 of the first direction vector 23a and the second direction vector 23b within the writing area 14.

Figure 3:
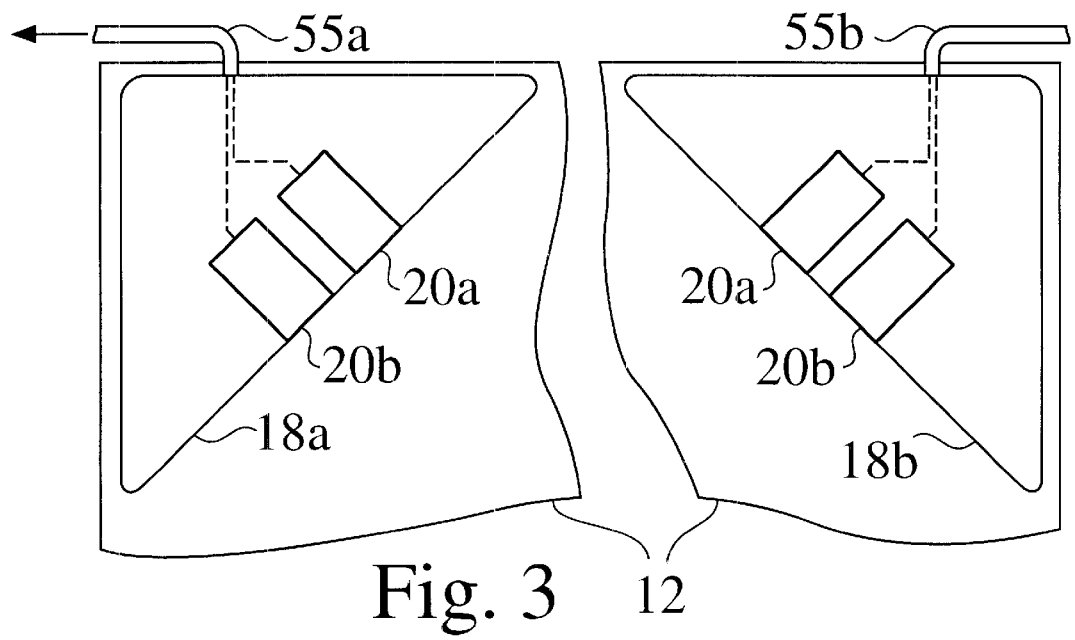
FIG. 3 is a partial top view of receiver locations located on a surface.

FIG. 3 is a partial top view of external receivers 20a,20b at receiver locations 18a,18b, which are located on a surface 12. The first receiver location 18a includes a first external receiver 20a and a second external receiver 20b, and includes a signal connection 55a towards a signal processor 57 (FIG. 10). The second receiver location 18b also includes a first external receiver 20a and a second external receiver 20b, and includes a signal connection 55b to the signal processor 57.

Direction of Arrival Transmitter Pen Location Process. The direction of arrival transmitter pen location process (FIGS. 1–4, 10), which uses an output signal 16 to locate the single signal transmitter pen 30a relative to the writing area 14 of a white board 12, comprises the following steps:
  i) sending an output signal 16 from a single signal transmitter pen 30a to a plurality of external receivers 20a, 20b at a plurality of receiver locations 18;
  ii) determining the angle 15a, 15b from each of plurality of the receiver locations 18 to the single signal transmitter pen 30a, based on the difference in phase of the received output signal 16 at the external receivers 20a, 20b; and
  iii) determining the location of the single signal transmitter pen 30a based upon the determined angle 15a, 15b from each of the plurality of the receiver locations 18 to the single signal transmitter pen 30a.

Figure 4:
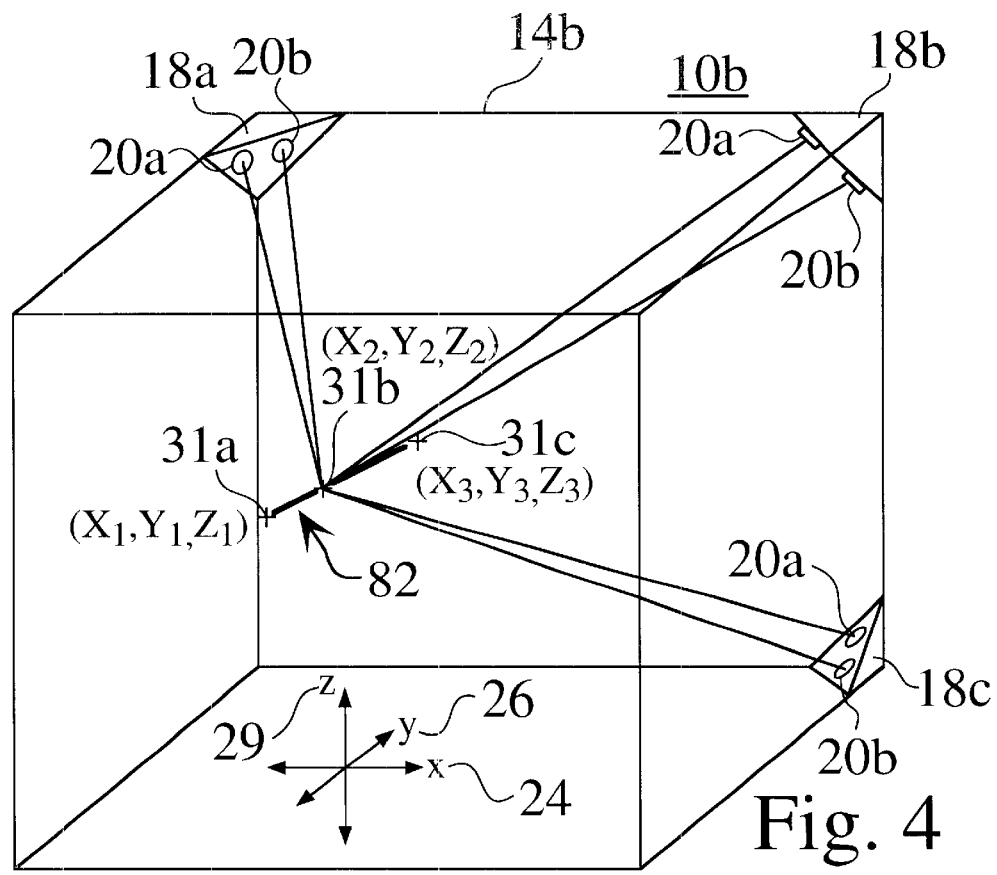
FIG. 4 is a perspective view of an alternate embodiment of a direction of arrival transmitter pen location system, in which a single signal transmitter pen is located within a writing volume.

FIG. 4 is a perspective view of an alternate embodiment of the direction of arrival transmitter pen location system 10b, in which a single signal transmitter pen 30a is located within a writing volume 14b, and in which the single signal transmitter pen 30a periodically sends an output signal 16 to external receivers 20a and 20b at each of three receiver locations 18a, 18b, and 18c. The geometric relationship between the single signal transmitter pen 30a and the receiver locations 18a, 18b and 18c is repeatedly determined, wherein the successive calculated (X,Y,Z) positions 31a, 31b, 31c of the single signal transmitter pen 30a describe a path 82, in relation to an X-axis 24, a Y-axis 26, and a Z-axis 29.

Figure 5:
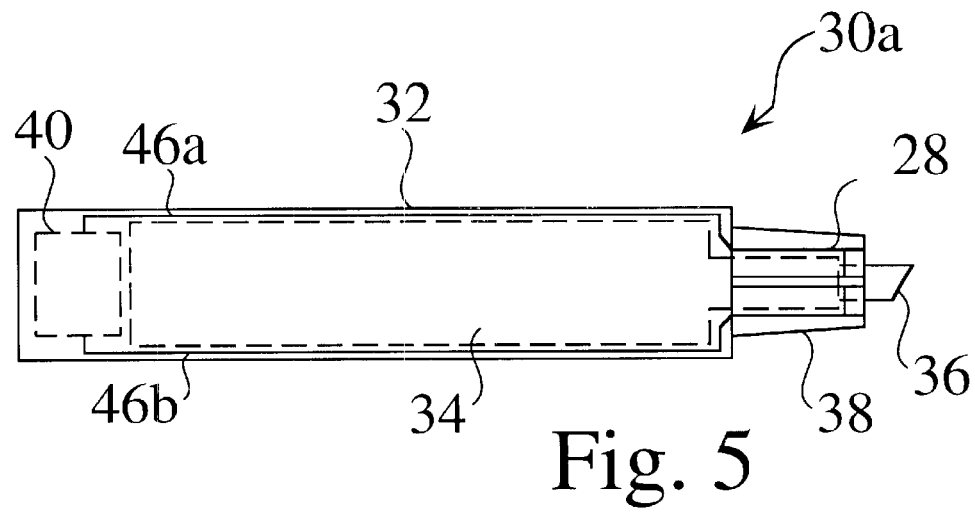
FIG. 5 is a partial cutaway view of a single signal transmitter pen having an output signal transducer.
Figure 20:
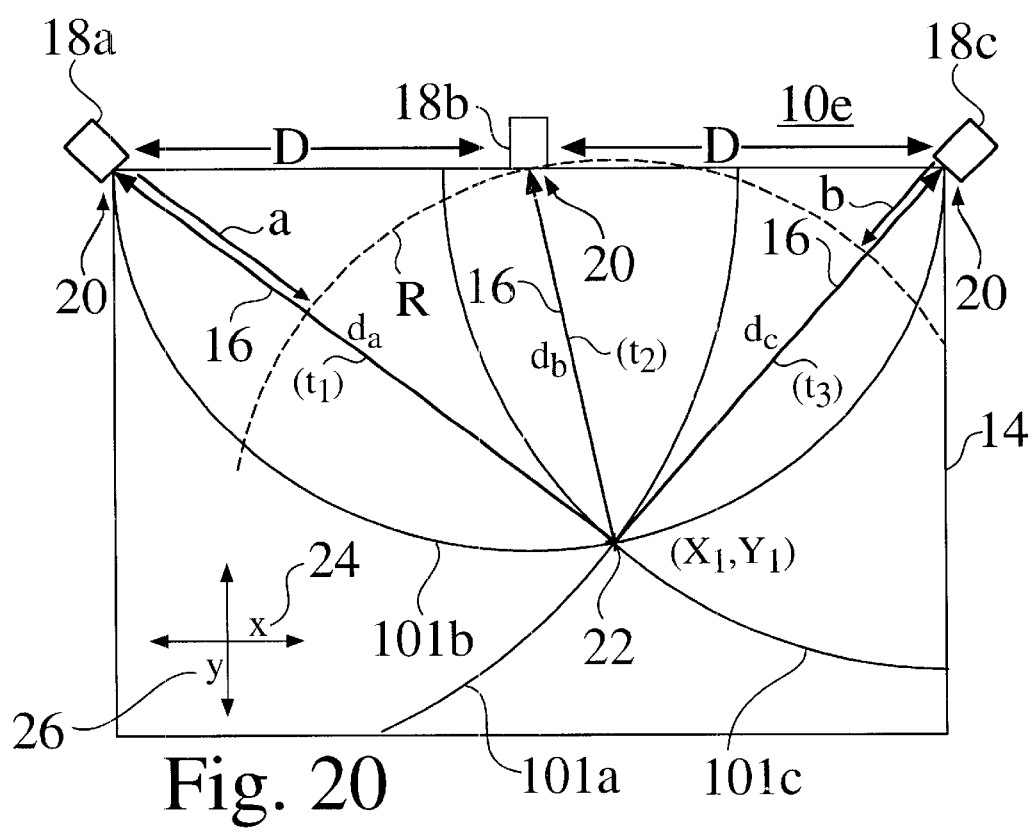
FIG. 20 is a top view of a time of arrival transmitter pen location system, which shows the geometric relationship between a single signal transmitter pen and three external receivers, with the calculated position of the single signal transmitter pen shown as the intersection of three arc lengths.

Single Signal Transmitter Pen. FIG. 5 is a partial cutaway view of a single signal transmitter pen 30a having an output signal transducer 28, which is used with either the direction of arrival location system 10a, 10b, 10c (FIGS. 1,2,4,10 ) or the time of arrival location system 10d (FIG. 20). While the transmitter pen 30a is described as a pen, it can be any sort of movable transmitter device. The transmitter circuitry 40, connected to the output signal transducer 28 through leads 46a and 46b, excites the output signal transducer 28 to produce an output signal 16. In one embodiment, the output signal 16 pulse train 89 (FIG. 11) has a periodic frequency of 100 pulses per second. It is preferred that the transmitter circuitry 40 include an out-of-phase driving mechanism, which effectively shapes and squelches the output-signal 16 to produce a short duration pulsed output signal 16.

Figure 6:
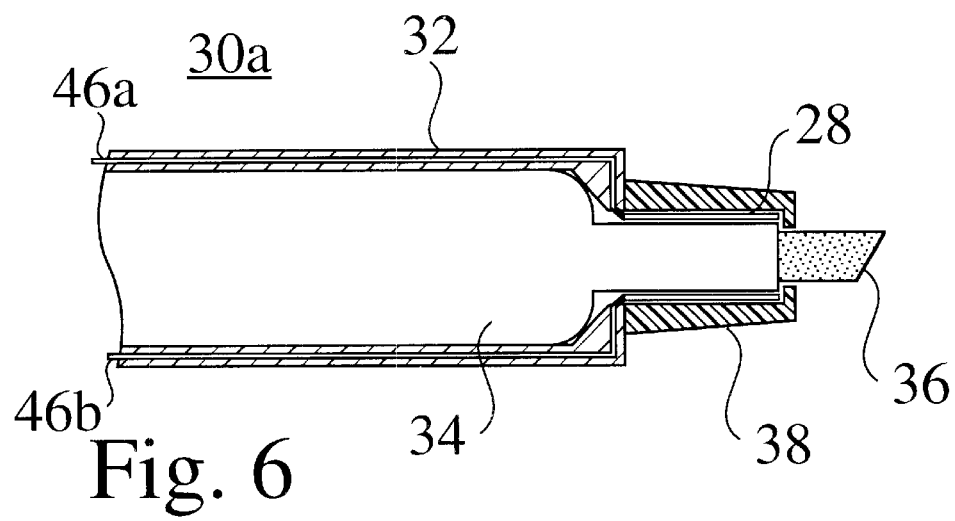
FIG. 6 is a detailed cutaway view of the pointing tip of a single signal transmitter pen having an output signal transducer.

FIG. 6 is a detailed cutaway view of the pointing tip 36 of a single signal transmitter pen 30a having an output signal transducer 28. FIG. 7 is a partial perspective view of the pointing tip 36 of a single signal transmitter pen 30a having a single piezoelectric output signal transducer 28. An optional finger guard 38 protects the output signal transducer 28.

Output Signal Transmission. FIG. 8 is schematic view 50 of the transmission of the output signal 16 from a single signal transmitter pen 30a, which is typically an ultrasound output signal 16. The output signal 16 is transmitted from one or more transducers 28 located near the pointing tip 36 of the single signal transmitter pen 30a. In one embodiment, the transducer 28 is a cylindrical layered piezoelectric layer 56 surrounded by an outer conductive layer 54a and an inner conductive layer 54b, which is connected to the transmitter circuitry 40 by leads 46a and 46b and lead connections 52a and 52b. In another embodiment, the ultrasound transducer 28 used is Part No. AT/R 40-10P, manufactured by Nippon Ceramic Co. Ltd., of Tottori-Shi, Japan. The single signal transmitter pen 30a repeatedly transmits output signals 16, typically periodically, with a period 95 (FIG. 11).

Figure 9:
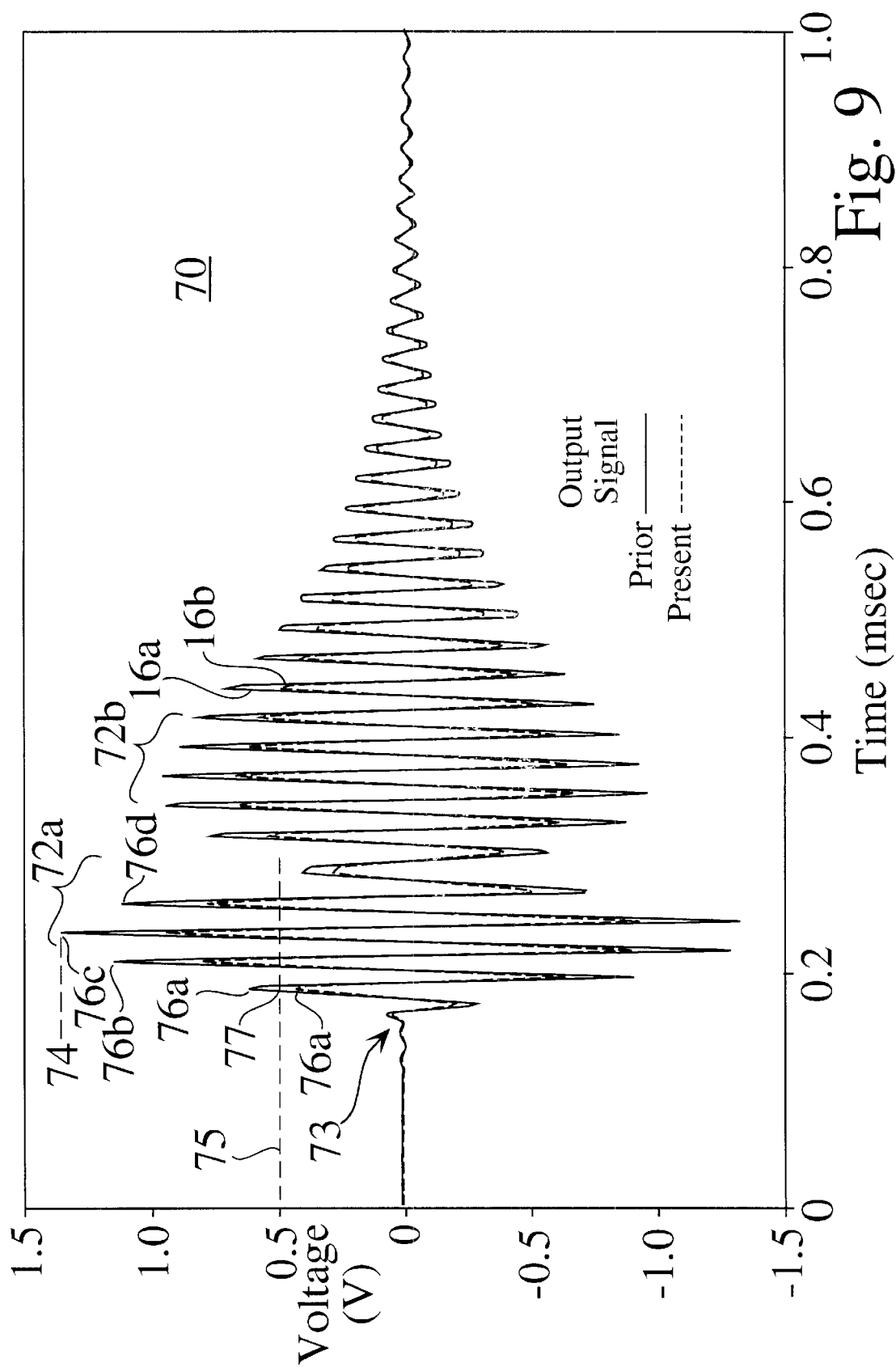
FIG. 9 shows a shaped pulse waveform of one embodiment of an output signal sent from a transmitter pen.

FIG. 9 shows a prior shaped pulse waveform 16a and a present, subsequent shaped pulse waveform 16b sent from either a single signal transmitter pen 30a, 30b (FIG. 25), or a dual signal transmitter pen 30c (FIGS. 26, 28–30 ). While an ultrasound second output signal 16 can have any waveform shape, including a single ultrasound pulse 72, it is preferred that the waveform be shaped to have a short duration, with distinctive wave characteristics, which allows the waveform to be measured and compared accurately, to provide an accurate calculated position for a transmitter pen 30. In the preferred embodiment shown in FIG. 9, the subsequent second output signals 16a, 16b each include two major pulses 72a and 72b, with specific timing between them.

While there are differences between the received amplitude of the subsequent second output signals 16a and 16b, each of the signals 16 retain major features, such as waveform characteristics 72a, 72b, as well as wavelength dependent features, such as peaks 76a, 76b, 76c, and 76d, the position of relative peaks 76, and peak amplitudes. Comparison of these features between subsequent stored digitized output signals 16a and current output signals 16b allows the calculated transcribed path 82 of a transmitter pen 30 to be accurately determined. As well, the use of distinctive waveform characteristics 72a, 72b allows the transmission of other information to be sent from the transmitter pen 30 to the external receivers 20, as, discussed below.

Comparison of the present output signal 16b to one or more stored output signals 16a is preferably repeated for all external receivers 20 at each receiver location 18, giving multiple estimates of the time of propagation of the output signal 16b, and different arrays with the stored prior signals 16a.

FIG. 10 is a top view 80 of one embodiment of the direction of arrival transmitter pen location system 10c, which shows a calculated transcribed path 82 of a single signal transmitter pen 30a from sequential locations within the writing area 14 of a surface 12. As the single signal transmitter pen 30a is moved by a user across the writing area 14 of the surface 12, the repeated transmission of output signals 16 is received at the external receivers 18. The receivers 18 are connected 55 to a signal processor 57, which calculates successive X-Y locations 84a, 84b, . . . 84n, in relation to a defined X-axis 24 and a Y-axis 26. The successive X-Y locations 84a, 84b, . . . 84n define a path 82 for the single signal transmitter pen 30a. The successive X-Y locations 84a, 84b . . . 84n, and the defined path 82 can then be stored or transferred by the signal processor 57.

In a preferred embodiment, a functional area 85 is defined within the writing area 14 of the surface 12. Activation of the single signal transmitter pen 30a within the functional area 85 is selectively used to send function commands to either the signal processor 57, or to a computer 87 connected to the signal processor 57. Function commands can be used to print the displayed image path 82, save the image path 82, create a new page, or to control functions on the connected computer 87, such as by activating pull-down menus on a graphic-user interface (GUI) 93 on the connected computer 87.

In another preferred embodiment, a programmable control application 91 within the computer 87 communicates with the signal processor 57, to control system options, such as waveform comparison algorithms, and the desired number of previous output signals 16a to be stored 99 and compared to current output signals 16b. Since the prior output signals 16a are captured and stored in a digital manner, the comparison between prior output signals 16a and current output signals 16b can be efficiently monitored or modified through the programmable control application software 91.

FIG. 11 shows an output signal 16 as it is sent from a single signal transmitter pen 30a, 30b. The output signal pulse train 89a is comprised of a repeated transmission of an output signal 16. The repeated transmission of the output signal 16 is typically characterized by a period $P_1$ 95.

Direction of Arrival Transmitter Pen Location Algorithm. In the embodiment shown in FIGS. 11–13, the ultrasound output signal 16 arrives at each of the external receivers 20a, 20b at receiver locations 18 at times which are dependent on the speed of the output signal 16, and the distance between the transmitter pen 30 and receivers 20a, 20b. FIG. 12 shows the output signal 16 as it arrives at a first external receiver 20a of a first receiver location 18a. FIG. 13 shows the same output signal 16 as it arrives at a first external receiver 20a of a second, further receiver location 18b. At each of the receiver locations 18a, 18b, the time of arrival of the output signal 16 is dependent on the distance between the movable single signal transmitter pen 30a, 30b and each of the external receivers 20a and 20b. The difference in path length, for the arriving output signal 16 between neighboring receivers 20a, 20b, is seen as a shift in phase of the arriving output signal 16, and is analyzed by the signal processor 57 to determine the direction of arrival 15a, 15b of the output signal 16 to each receiver location 18.

The accuracy of the location of the single signal transmitter pen 30a is therefore dependent on the accuracy with which the signal processor 57 connected to the external receivers 20 at receiver locations 18 can consistently determine the direction of arrival 15a, 15b of the ultrasound signal waveform 16.

Direction of Arrival Location System Signal Processing. FIG. 14 is a graph showing a received output signal 16 at external receivers 20a, 20b at a receiver location 18. Since the external receivers 20a and 20b are slightly offset from each other, the output signal 16 typically defines a slightly different path length to arrive at the external receivers 20a and 20b. The calculated phase difference 90 between the received output signal 16 at external receivers 20a, 20b at receiver location 18a, provides the first incline angle $\theta_1$ 15a. Similarly, the calculated phase difference 90 between the received output signal 16 at external receivers 20a, 20b at receiver location 18b is analyzed by the signal processor 57, and provides the second incline angle $\theta_2$ 15b. Given the first incline angle $\theta_1$ 15a and the second incline angle $\theta_2$ 15b, the X,Y position of the transmitter pen is determined within the two-dimensional writing area 14. For external receiver locations 18a, 18b that are separated by a distance $d_1$, the X,Y position of the transmitter pen 30 is given by:

$$X = \frac{d_1 \sin(\theta_2) * \cos(\theta_1)}{\sin(\theta_1 + \theta_2)}; \text{and} \quad (1)$$

$$Y = \frac{d_1 \sin(\theta_2) * \sin(\theta_1)}{\sin(\theta_1 + \theta_2)}. \quad (2)$$

It is preferable to space the external receivers 20a, 20b at each receiver location 18 away from each other, which results in a higher precision calculation of the incline angles $\theta_1$, $\theta_2$. However, if the external receivers 20a, 20b at each receiver location 18 are spaced apart by a distance greater than one wavelength of the transmitted frequency of the output signal 16, there can be ambiguity in the phase shift equal to n*T, where T is equal to the period of the transmitter output signal 16 equal to (1/λ), and n is the number of wavelengths of separation between the external receivers 20a and 20b at each receiver location 18.

Determination of the number of full cycle shifts that exists between received output signals 16 at separated external receivers 20a and 20b is accomplished by the signal processor 57 (FIG. 10). While there are differences-between the received amplitude of the output signals 16 at neighboring external receivers 20a, 20b at each receiver location, each of the signals 16 retain major features, such as waveform characteristics 72a, 72b, as well as wavelength dependent features, such as peaks 76a, 76b, 76c, and 76d, the position of relative peaks 76, and peak amplitudes. Comparison of these features between digitized output signals 16 at neighboring receivers 20a, 20b allows the direction of arrival 15a, 15b of a second output signal 16 to be accurately determined.

Figure 15:
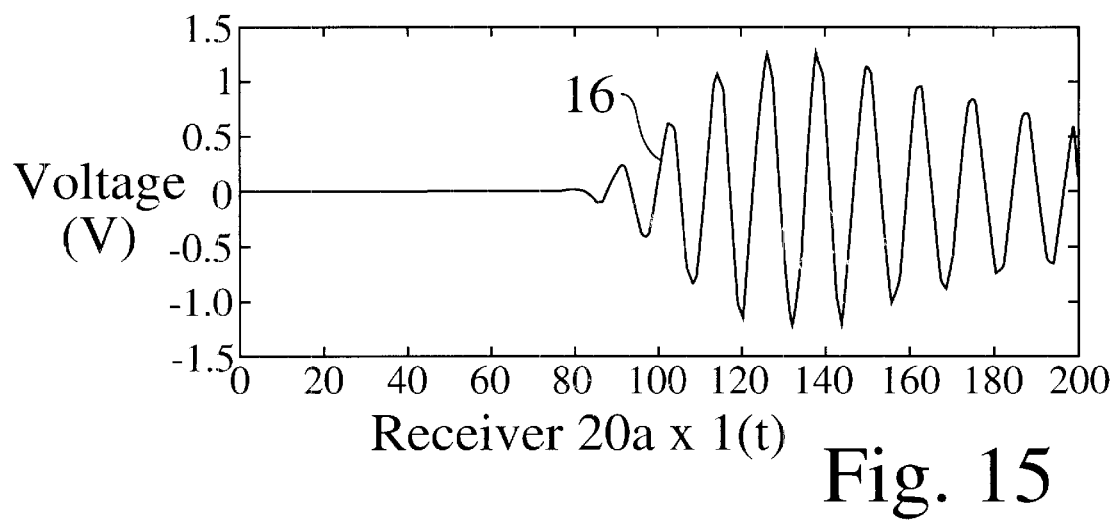
FIG. 15 shows an output signal arriving at a first external receiver at a first receiver location.
Figure 16:
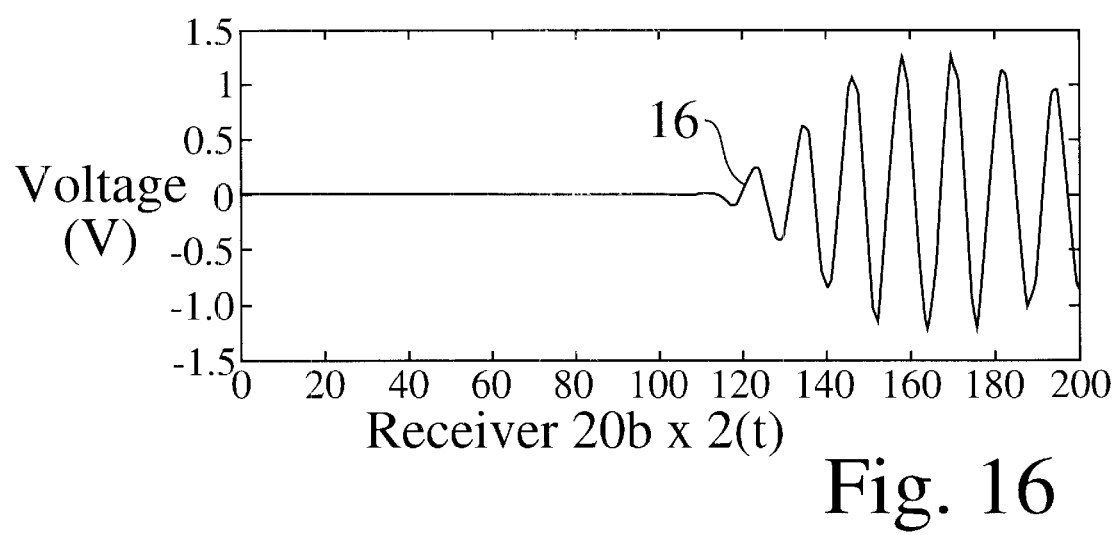
FIG. 16 shows an output signal arriving at a second external receiver at a first receiver location.

While the above approach allows the phase difference to be measured with an accuracy of ±1 sample, resolution can be further improved to better than ±1 sample. FIG. 15 and FIG. 16 show a typical system configuration, where the arrival of the output signal 16 at the first external receiver 20a lags the arrival of the output signal 16 at the second external receiver 20b by multiple wavelengths.

Assuming that the output signals 16 $x_1(t)$ and $x_2(t)$ at receivers 20a and 20b, as shown in FIG. 15 and FIG. 16, are approximated as sine waves with amplitude modulation. The approach described above gives delta ($\Delta$) as the phase difference approximation between $x_1(t)$ and $x_2(t)$. Letting $x_2'(t)=x_2(t+\Delta)$, the signal processor 57 can calculate the additional phase difference correction $\phi$as:

$$\frac{\int_0^{nperiods} x_1(t)*x_2'(t)dt}{\int_0^{nperiods} x_1(t+T/4)*x_2(t)dt} = \text{arccot}(\emptyset) \quad (3)$$

Figure 17:
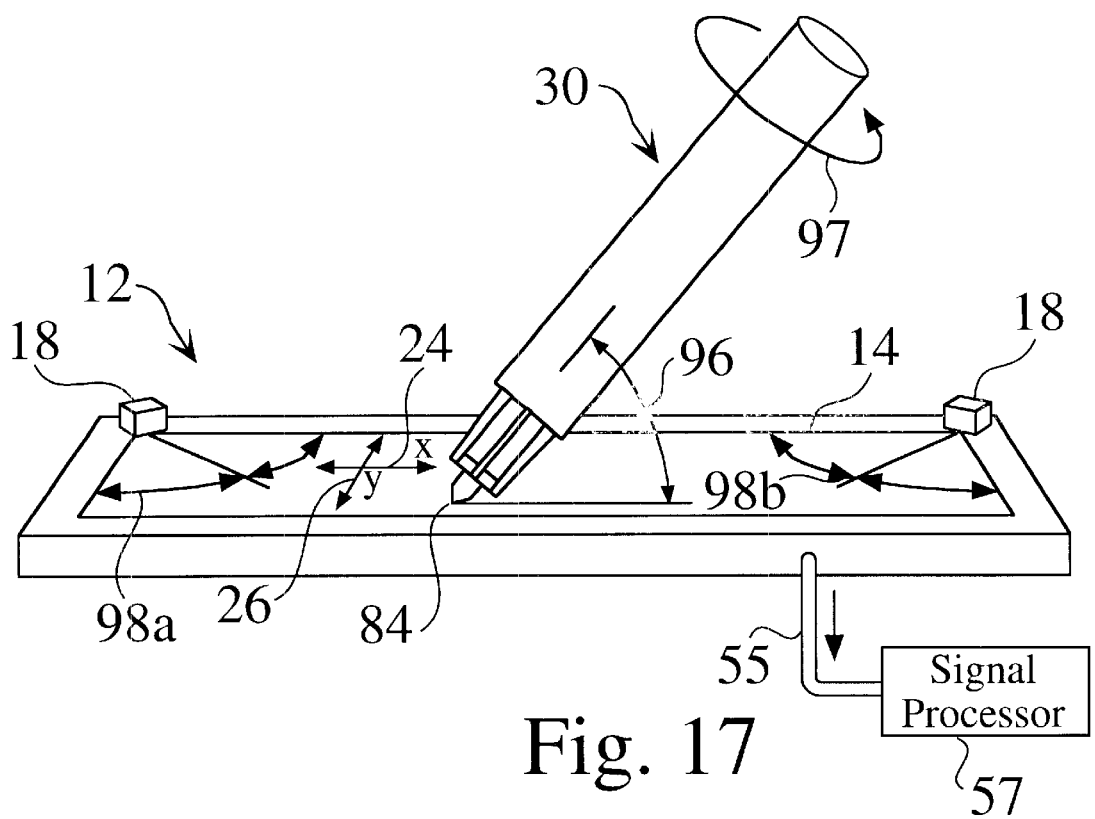
FIG. 17 is a perspective view showing changes in transmitter pen orientation which can alter the received waveform of the second output signal as it arrives at an external receiver.
Figure 18:
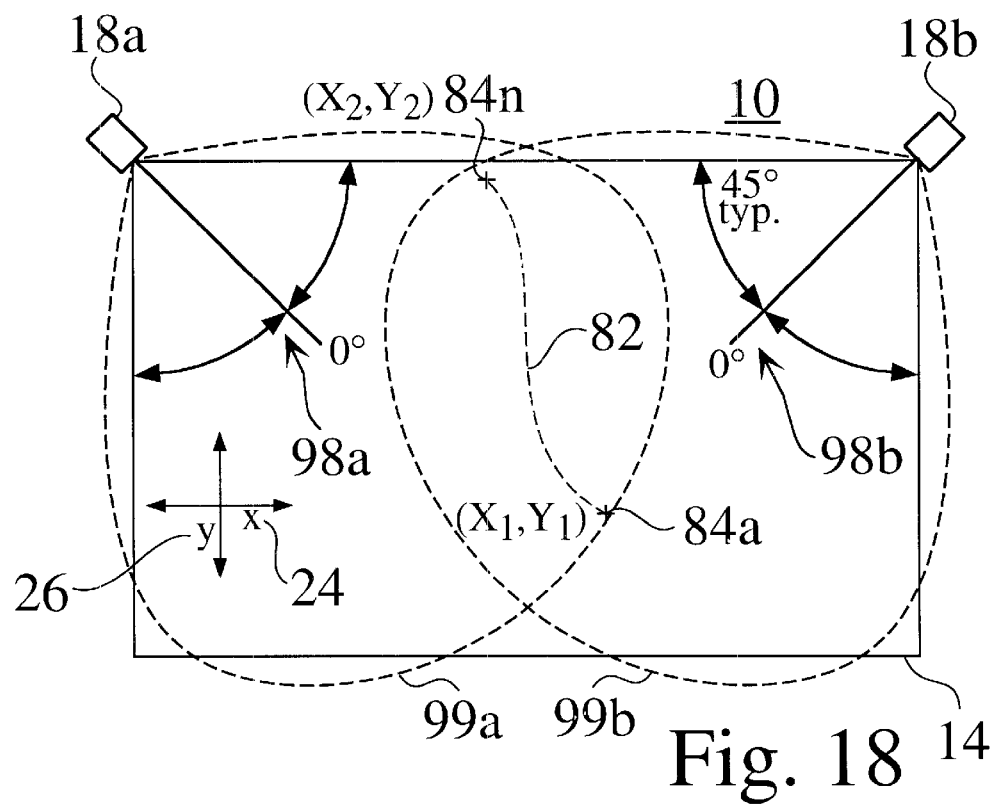
FIG. 18 a top view showing the directional reception characteristics of one embodiment of second output sensors at external receivers.

FIG. 17 is a perspective view showing changes in transmitter pen orientation in relation to external receiver locations 18a, 18b, which can significantly alter the received waveform of the output signal 16 as it arrives at receiver locations 18,118. As discussed above, the amplitude of the incoming waveform 16 can change significantly from the distance to each of the receiver locations 18a, 18b. Other factors also contribute to the attenuation of the output signal 16, including the angular orientation 98a, 98b between the transmitter pen 30 and the external receivers 20, the angle 96 of the inclined movable transmitter pen 30 against the surface of the writing area 14, the axial rotation 97 of the transmitter pen 30, and even the available source power to the output circuitry 40 within the transmitter pen 30. FIG. 18a top view showing the directional reception characteristics 99a, 99b of one embodiment of external receivers 20a, 20b at receiver locations 18a, 18b. The external receivers 20a, 20b within receiver locations 18a, 18b are typically placed at an angle of approximately 45 degrees in relation to a rectangular writing area 14, to improve signal detection of the second output signal 16.

The direction of arrival, transmitter pen location system 10a, 10b, 10c can accurately determine the location of the transmitter pen 30, even when the output signal 16 is significantly attenuated. The direction of arrival transmitter pen location system 10a, 10b, 10c includes simultaneous output: signals 16a arriving at closely spaced external receivers 20a, 20b at each receiver location 18. While the output signal 16 is commonly attenuated, as discussed above, attenuation characteristics are similar between the output signal as it received at closely spaced external receivers 20a, 20b. Therefore, the comparison of the received output signal 16 to calculate of direction of arrival yields accurate results.

As well, in a preferred embodiment, the direction of arrival transmitter pen location system 10a, 10b, 10c advantageously stores one or more prior signals 16a for each external receiver 20a, 20b, allowing the comparison of a large number of features between the current second output signal 16b and one or more prior second output signals 16a for each external 20a, 20b.

Since the current output signal 16b and one or more stored prior output signals 16a are typically normalized to each other, and since detailed features between the current output signal 16b and one or more stored prior output signals 16a can be used for comparison, attenuation of the incoming signals; 16 does not prevent the direction of arrival transmitter pen location system 10a, 10b, 10c from accurately determining the X,Y position of the transmitter pen 30.

In contrast, prior art analog systems that rely on the comparison of a limited number of measured amplitudes of a limited number of points, such as the measured amplitudes of bursts or peaks, or an average of a limited number of peaks, will commonly fail to find a valid data point for a movable pointer, particularly when consecutive output pulses are attenuated differently. This results either in erroneous positions (e.g. typically by missing a desired signal peak), or in requiring that position points are not used in the described path of a movable pointer, resulting in an inaccurate or erratic described path.

In a preferred embodiment of the digital direction of arrival array transmitter pen location system 10a, 10b, 10c, the storage of the received signal 16 to memory 158 allows signal processing comparison techniques between the current output signal 16b and the stored waveform 16a to be performed, such as by cross-correlation methods. An accurate comparison between the features of the present 16b and prior output signals 16a can therefore be made. As the second output signals 16b arrive at the signal processor 57, they are preferably normalized to prior stored signals 16a. When the received second output signals 16b and one or more stored second output signals 16a are normalized to each other, a valid comparison can be made between the normalized output signals 16a, 16b. When the received output signals 16b and one or more stored second output signals 16a have widely varying signal strengths, it is still possible to cross-correlate features between the normalized signals, rather than to compare the amplitude of a limited number of data points.

In addition, preferred embodiments of the direction of arrival transmitter pen location system 10a, 10b, 10c allow changes to the comparison of features between the current second output signal 16b and one or more stored prior second output signals 16a. The programmable control application 91 (FIG. 10) is typically controllable and updatable, allowing the signal processor 57 to be updated, and to be easily adapted to different transmitter pens 30, different surfaces 12, and different external receivers 20.

Communication of Supplementary Information. The output signal characteristics of the circuitry 40 and characteristic transmitter output signal 16 can optionally communicate secondary information to the receiver locations 18. Such supplementary information can include pen activation status, or pen types, such as different colored pens, or for pens of different widths, or even for calculated line types, such as for dashed lines. In systems where more than one user is writing on the white board 12, either sequentially of concurrently, the transmitter pens 30 can optionally communicate the designated user of each transmitter pen 30.

Pen Activation. FIG. 9 shows a typical output signal 16b for a transmitter pen 30 in a "pen down" position. The output signal 16b is modifiable by the transmitter circuitry 40 to designate different signal states, such as to communicate whether the pen is inactivated in a first "pen up" position, or in an activated second "pen down" position. In FIG. 9, the present output signal 16b includes two waveform pulses 72a, 72b to designate a "pen down" position. In the same embodiment, the present output signal 16b typically includes a single ultrasound pulse 72a to designate a "pen up" position.

When the "pen up" signal is received by the external receivers 20, the signal processor 57 determines that the transmitter pen 30 is currently in its "pen up" position. The "pen up" position typically means that the pointing tip 36 of the transmitter pen 30 is not in contact with either the writing area 14 of the surface 12, or with another writing surface placed within the writing area 14, such as a piece of paper.

When the "pen down" signal is received by external receivers 20, the signal processor 57 determines that the pen 30 is currently in its "pen down" position, and the directions of arrival 15a, 15b of the pen 30 are also determined. The "pen down" position 68b typically means that the pen tip 36 is in contact with either the writing area 14 of the surface 12, or with another writing surface placed within the writing area 14, such as a piece of paper.

As the transmitter pen 30, is moved along a path 82 in the pen-down position, a series of output signals 16 are received at the external receivers 20, from which successive directions of arrival are calculated, and subsequently X-Y coordinates are determined, to produce a representation of the path 82 of the transmitter pen 30. In some embodiments, the position of the transmitter pen 30 is also calculated when the transmitter pen is not in contact with the writing area 14.

Calculated Pen Attributes. The transmitter circuitry 40 in the transmitter pen 30 preferably communicates pen attributes, and can include switching or continuous adjustment control to produce a transmitter signal 16 indicative of different pen attributes. For example, a transmitter pen 30 which contains a single writing tip 36 having one color of ink, such as black ink, may be selectively adjusted by the user to produce an output signal 16 that corresponds to drawn paths 82 of varying colors, widths, or line styles. While the user draws or writes upon a writing surface 14, such as a white board 12, displaying a black path 82 (FIG. 10), such as figures or letters, the transmitted and processed signal for the path 82 is dependent upon the pen characteristics chosen by the user.

While FIG. 9 shows an output signal 16 that indicates a pen down position, using a two waveform pulses 72, the addition and spacing of waveform pulses 72 are preferably used to communicate encoded supplementary information, such as designated color, width, line type, or author.

In the output signal 16 shown in FIG. 9, the time between multiple waveform pulses 72 spans a time that is specific to a particular pen color. For example, a first time delay between the waveform pulses 72 can specify al pen color of black, while a second time delay between the waveform pulses 72 can specify a pen color of blue.

Direction of Arrival Transmitter Pen Location System Advantages. The direction of arrival transmitter pen location system 10a, 10b, 10c offers significant advantages over prior art location methods. The use of an improved process for calculating the phase difference between arriving output signals 16 allows the directions of arrival 15a, 15b to be determined accurately, and allows the transmitter pen 30 to have a single transmitter 28.

Self Calibration. The distance $d_1$ 17 (FIG. 1) between receiver locations 18 can either be set once, such as for receiver locations 18 that are mounted a fixed distance from each other, or can be periodically set, such as for receiver locations 18 that can be remounted at different positions. The distance do between fixed receiver locations 18 can be stored within the signal processor 57, such as for manufactured transmitter pen 30 and board systems 10 in which the distance between fixed receiver locations 18 is controlled by the design of the surface 12.

Figure 19:
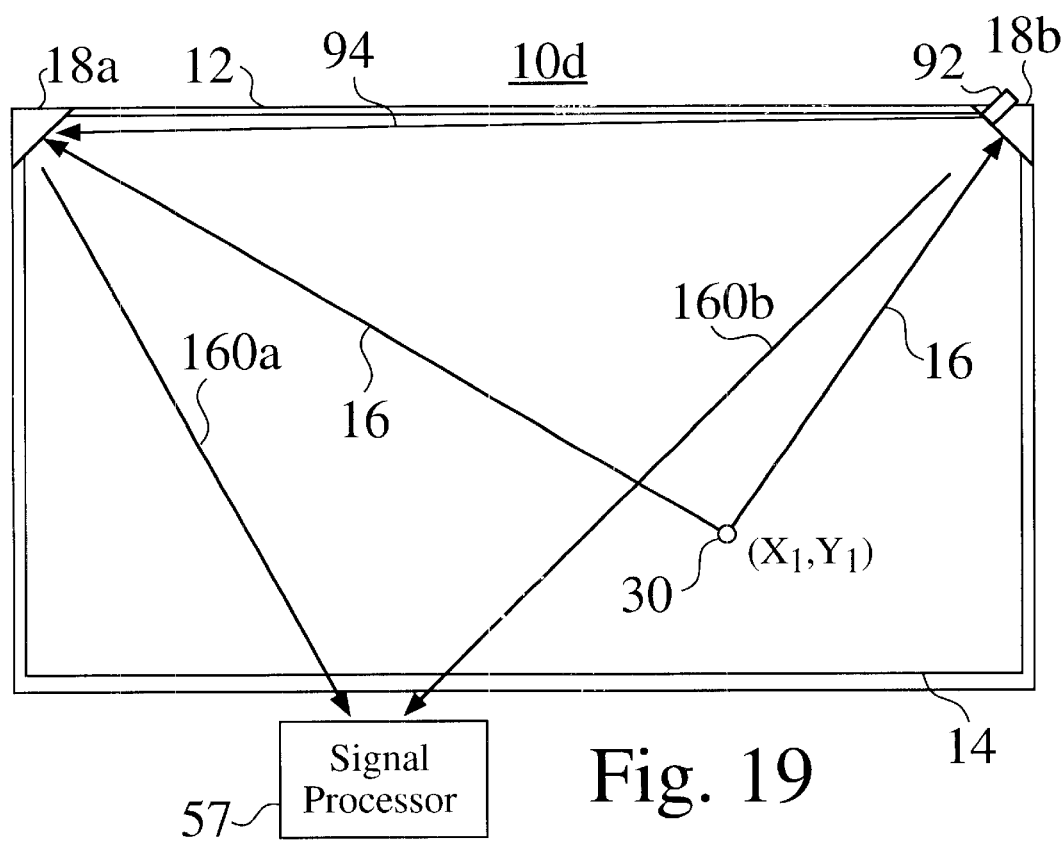
FIG. 19 is an alternate embodiment of the transmitter pen location system, having movable receivers, an automatic-calibration transmitter, and wireless communication between the receivers and the signal processor.

FIG. 19 is an alternate embodiment of the transmitter pen location system 10d, in which the receiver locations 18a, 18b are movable, wherein a calibration transmitter 92 is added at one receiver location 18b, providing automatic self-calibration for the system 10d. An auto-calibration transmission signal 94 is sent from the receiver location 18b, and is received at another receiver location 18a. The signal processor 57 analyzes the incoming auto-calibration transmission signal 94, and determines the distance $d_1$ between the receiver locations 18a, 18b. A wireless connection is provided between the receivers 18a, 18b and the signal processor 57, wherein information data signals 160a, 160b are transmitted from the receiver locations 18a, 18b to the signal processor 57.

Alternate Embodiments for Direction of Arrival Transmitter Location System. The direction of arrival transmitter pen location system 10a, 10b, 10c can also be adapted to larger writing areas 14. In basic embodiments, the period between subsequent output signal pulses 16 is determined by the largest distance across the writing area 14.

Figure 24:
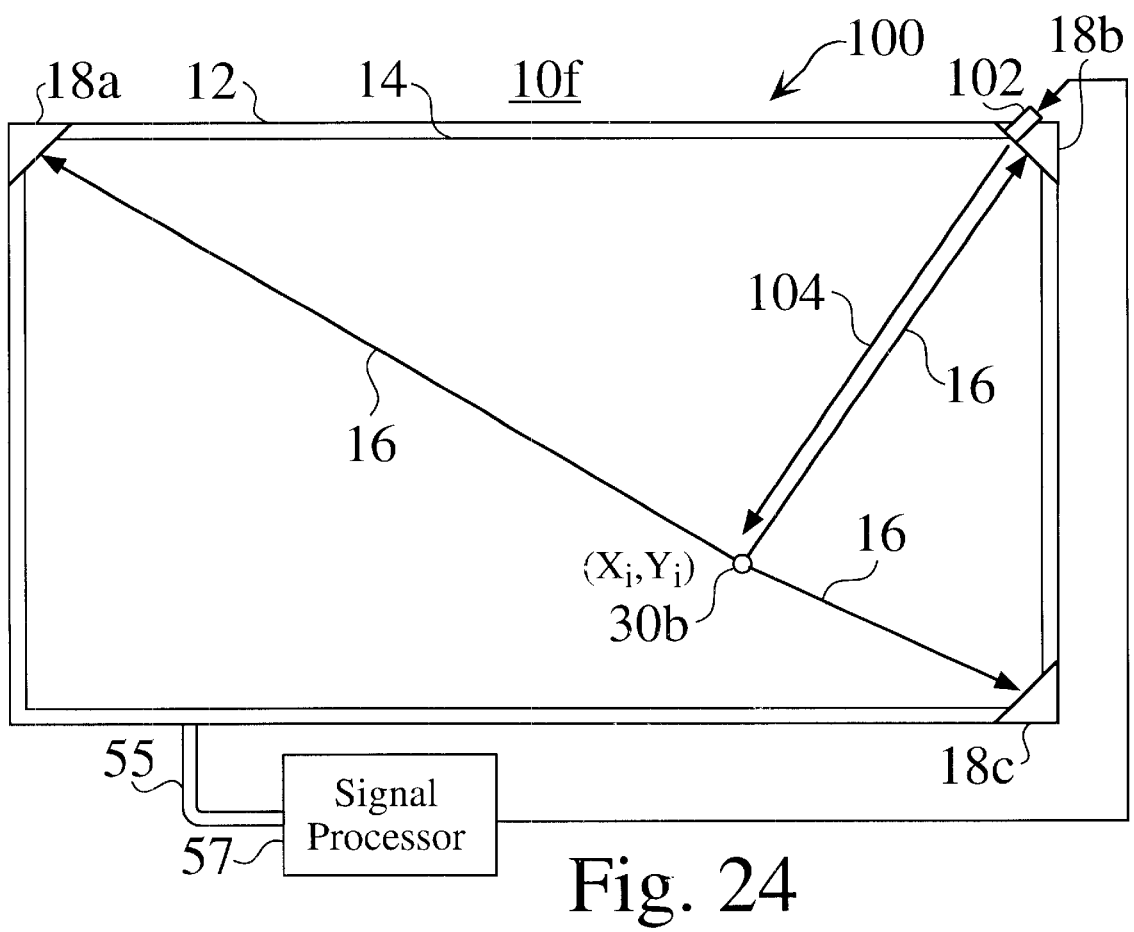
FIG. 24 shows a large writing area direction of arrival transmitter pen location system, in which a white board transmitter sends a return signal to a transmitter pen having a receiver circuit; allowing the period between subsequent output signals to be controlled.
Figure 25:
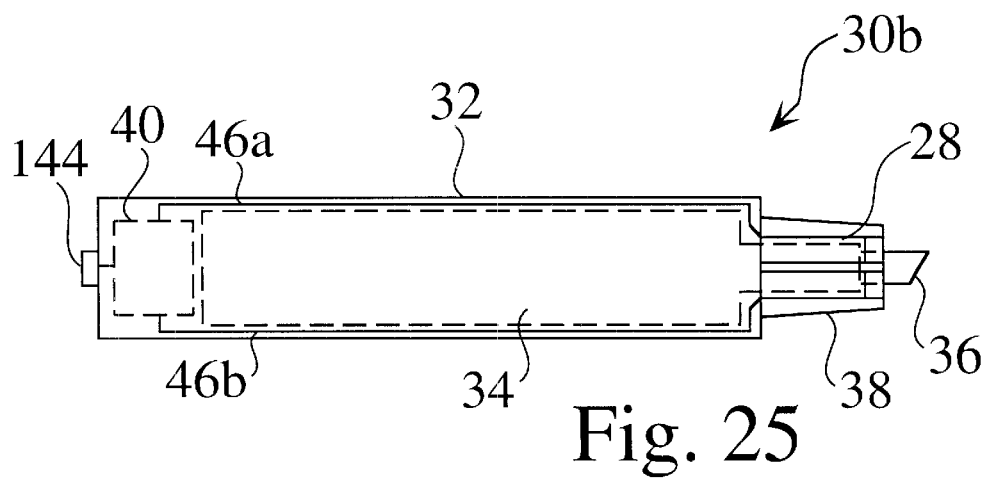
FIG. 25 shows a large writing area single signal transmitter pen having a receiver circuit.

In an alternate, large white board embodiment 10f shown in FIG. 24 and FIG. 25, the single signal transmitter pen 30b includes a pen receiver 144, and the surface 12 includes a white board transmitter 102, which in this embodiment is shown next to one of the receiver locations 18b. As the transmitter pen 30b reaches the periphery of the writing area 14, the signal processor 57 determines that the single signal transmitter pen 30b is far from one or more of the receiver locations 18. The increased distance requires a longer period between subsequent output signals 16. In this event, the signal processor 57 sends a return signal 104 to the transmitter pen receiver 144 through the white board transmitter 102. The signal circuitry 40 within the single signal transmitter pen 30b then controllably lowers the frequency of transmission of output signals 16, in response to the return signal 104. Lowering the transmitted frequency of the single signal pulse train 89a allows each of the output signals 16 to reach the furthest of each of the external receiver locations 18 before the transmission of a subsequent output signal 16, so that there is no overlap of information between receipt of the output signals 16. While the extended period between output signals 16 allows less frequent updates of the location of the movable single signal transmitter pen 30b, the large area system 10e allows the single signal transmitter pen 30b to be located accurately over a large writing area 14.

Time of Arrival Transmitter Pen Location System. FIG. 20 is a top view of a time of arrival transmitter pen location system 10e, which shows the geometric relationship between a single signal transmitter pen 30a, 30b and three or more external receiver locations 18a, 18b, 18c, each having a single external receiver 20. In the time of arrival transmitter location system 10e, the position of the single signal transmitter pen 30a, 30b is calculated as the intersection of three arc lengths 101a, 101b and 101c. By using three or more receiver locations 18a, 18b, . . . 18n, one of the signal paths 16 acts as a relative starting point for the other signal paths 16.

Since the output signal 16 can be attenuated differently as it arrives at each of the external receiver locations 18a, 18b, 18c, as seen in FIG. 9, the signal processor 57 preferably compares repeatable reference points 77 (FIG. 9) between present signals 16b arriving at each receiver 18a, 18b, 18c and one or more stored prior output signals 16a for each receiver 18a, 18b, 18c. Any repeatable reference point 77 on the output ultrasound signal waveform 16 is sufficient to compare a present output ultrasound signal waveform 16b arriving at an receiver location 18 to a stored prior output ultrasound signal waveform 16a arriving at the same receiver location 18b, as long as the repeatable reference point 77 is consistently identified on the current output ultrasound signal waveform 16b and on the stored prior output ultrasound signal waveform 16a.

In FIG. 9, the crossing time threshold 73 indicates a starting point for the repeated ultrasound output signals 16. In time of arrival transmitter pen location system 10e, it is preferred to use a linearly decaying ultrasound threshold 73, since the amplitude of the ultrasound signal 16 falls off like 1/r with distance. At times t1, t2, . . . tN, where N equals the number of receiver locations 18 (where N≧3), as shown in FIG. 20, the ultrasound signal 16 is received at three or more external receiver locations 18.

The signal processor 57 finds a repeatable reference point 77 on the ultrasound output signal 16a, 16b, which in one embodiment lies between the threshold crossing 73 and the second peak 76b. In FIG. 9, a threshold value 75 of 0.5 volts is used to determine points along the subsequent output signals 16a, 16b. As seen in FIG. 9, the first point along the first output signal 16a to cross the threshold value is located along the first peak 76a. In contrast, the first point along the second output signal 16b to cross the threshold value 75 is located along the second peak 76b. Since subsequent output signals 16a, 16b typically have different amplitudes, arbitrary measurement of a threshold 75 to determine a reference point 77 can yield differences between subsequent signals 16 on the order of a wavelength.

To provide a more accurate repeatable reference point 77 on the present ultrasound output signal 16b that lies between the threshold crossing 73 and the second peak 76b, the signal processor 57 preferably stores a prior output signal 16a, and compares repeatable features between the present second output signal 16b and the stored prior second output signal 16a. Repeatable features that are distinguishable typically include the shape of major peaks 72a, 72b and minor peaks 76a, 76b, interpeak spacing, and the relative amplitude of the major peaks 72a, 72b and minor peaks 76a, 76b.

Since the prior output signal 16a is preferably stored, any or all features can be analyzed and compared, to determine an accurate repeatable reference point 77. Even the combined relationship between sets of features can be compared. In a preferred embodiment, the current output signal 16b and one or more stored prior output signals 16a are energy-normalized, such that individual peaks 72, 76 are fit to each other between the current output signal 16b and the stored prior output signals 16a. The normalized output signals are then compared for features that do not depend on the amplitude of separate points on the signals 16a, 16b, but on the relationship between features.

In the example shown in FIG. 9, the signal processor 57 adjusts the actual threshold crossing on peak 76b on the present output signal 16b by the period of one wavelength, to establish an adjusted threshold crossing 77 that is consistent with the features of the stored signal 16a. In this manner, the signal processor 57 preferably uses the previously received and stored pulse 16a, from the same external receiver location 18 to determine the repeatable reference point 77 on the current ultrasound signal 16b.

This preferred comparison is performed for the present output signal 16b and the prior output signal 16a for each of the receiver locations 18a, 18b, 18c. As the arriving second output signal 16 is typically attenuated differently as it is transmitted and sent to different receiver locations 18, the output signal 16a is preferably stored 99 for each external receiver 20 at receiver locations 18, to provide an accurate comparison for subsequent output signals 16 arriving at each external receiver 20.

The current ultrasound signal 16b for each receiver location 18, together with the detected start of the signal reference points 73 and repeatable points 77, are then stored within memory 99 for analysis of subsequent output signals 16. For each receiver location 18, one or more prior signals 16a, with reference points 73,77, can be used to determine repeatable features 77 of the current output signal 16b. However, a limited number of previous ultrasound signals 16a from each receiver location 18 are typically stored, to conserve memory space within memory 99.

This is repeated for all N receiver locations 18, giving N≧3 estimates of the time of propagation of the second output ultrasound signal 16b. The N≧3 output signals 16b, along with associated reference points 73,77, are then stored within memory 99 as prior output signals 16a, for the analysis of subsequent output signals 16b.

The comparison of the currently received output signal 16b to previously received and stored output signals 16a results in consistent time values, which yield consistent pen location values 84a, 84b, . . . 84n that define a smooth path 82 (FIG. 10).

Figure 21:
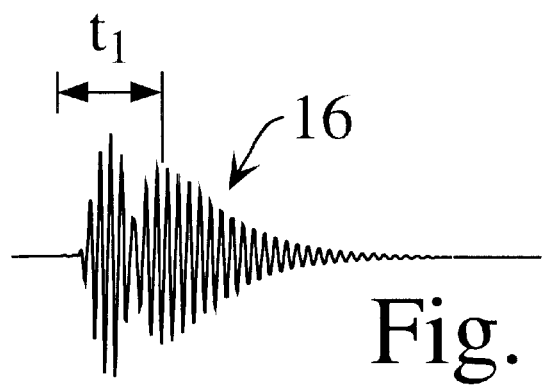
FIG. 21 shows an ultrasound pulse train signal as it is received at a first receiver location in a time of arrival transmitter pen location system.
Figure 22:
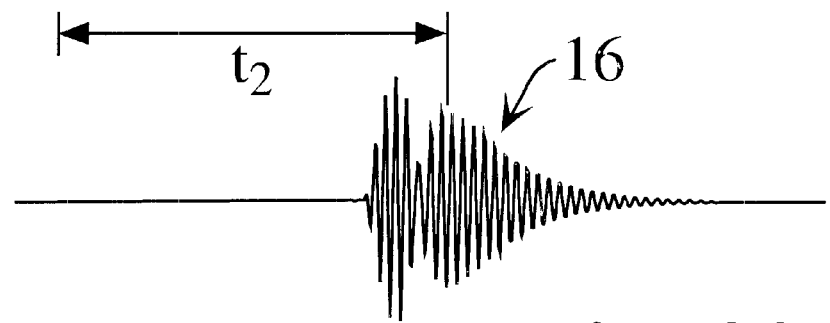
FIG. 22 shows an ultrasound pulse train signal as it is received at a second receiver location in a time of arrival transmitter pen location system.
Figure 23:
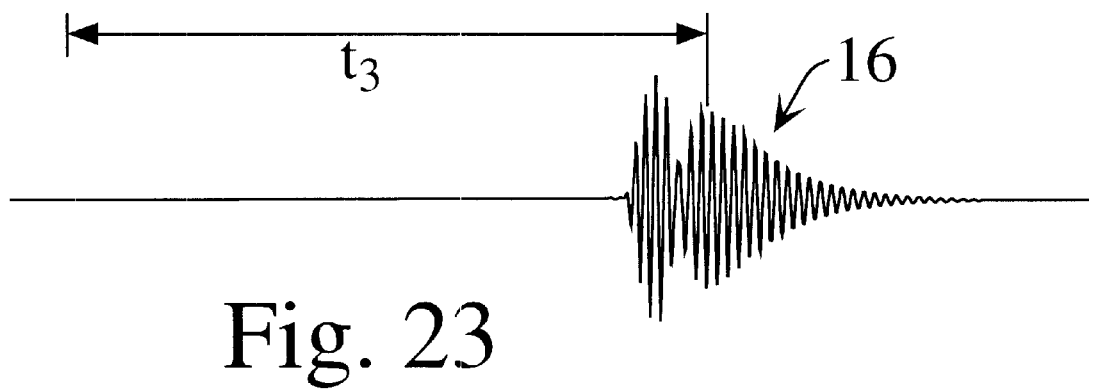
FIG. 23 shows an ultrasound pulse train signal as it is received at a third receiver location in a time of arrival transmitter pen location system.

Time of Arrival Transmitter Pen Location Algorithm. In the time of arrival transmitter pen location system 10e, each signal period is started and is defined by the transmission of an ultrasound waveform 16. FIG. 21 shows an ultrasound pulse train signal 16 as it is received at a first receiver location 18a at time $t_1$ in a time of arrival phase array ultrasound system 10d. Similarly, FIG. 22 shows the ultrasound pulse train signal 16 as it is received at a second receiver location 18b. at time $t_2$, and FIG. 23 shows the ultrasound pulse train signal 16 as it is received at a third receiver location 18c at time $t_3$. The relative time for the ultrasound signal 16 to arrive at the three receiver locations 18a, 18b, 18c provides an X-Y location of the single signal transmitter pen 30a, 30b. Times $t_1$, $t_2$, and $t_3$ are calculated, in terms of a and b (FIG. 20), which are then used to calculate the X-Y location of the single signal transmitter pen 30a, 30b. Time $t_2$ is given by:

$$t_2 = \frac{2D^2 - a^2 - b^2}{2(a+b)}. \tag{4}$$

Similar equations are derived for $t_1$ and $t_3$. From $t_1$ and $t_2$, X and Y values are given by:

$$X = \frac{t_2^2 - t_1^2 + D^2}{2D}; \text{ and} \tag{5}$$

$$Y = \sqrt{t_1^2 - X^2}. \tag{6}$$

System Calibration. Small variations in distance D (FIG. 20) between receiver locations 18 can also be calibrated by the signal processor 57 for the time of arrival transmitter pen location system 10d. This can be useful for many conditions, such as for the variation of the speed of sound in different ambient environments (e.g. temperature, barometric pressure, relative humidity). From three time estimates ($t_1$, $t_2$ & $t_3$) the signal processor 57 calculates the distance between receivers 18 (dcalc) as:

$$dcalc = \sqrt{\frac{t_3^2 - 2t_2^2 + t_1^2}{2}} \quad (7)$$

If the calculated dcalc is significantly different from the known distance D between receiver locations 18, the signal processor 57 determines that there is a problem with one or more of the time estimates $t_i$. The signal processor 57 can also average the known distance D with the calculated distance D between receiver locations 18, to adaptively change the value of D.

Combined Direction and Time of Arrival Dual-Signal Transmitter Pen Location System. FIG. 26 is a top view of a combined direction and time of arrival dual-signal transmitter pen location system 10 g, in which a dual signal transmitter pen 30c is located within the writing area 14 of a surface 12. FIG. 27 is a partial top view of a combined direction and time of arrival, dual signal receiver pod located on a surface. The dual-signal transmitter pen 30c has multiple transducer elements 28, 128 (FIGS. 28–30), which are used to determine the location of the pointing tip of the dual signal transmitter pen 30c, in relation to a writing area 14, or to a writing volume 14, of a combined direction and time of arrival dual-signal transmitter pen location system 10f.

The primary output transducer 28 transmits a primary output signal 16 from the dual signal transmitter pen 30b to external receivers 20a,20b at the receiver location 118. In one embodiment, the primary output signal sensors 28 are ultrasound sensors, Part No. AT/R 40-10P, manufactured by Nippon Ceramic Co. Ltd., of Tottori-Shi, Japan. In this embodiment, the primary output transducer 28 on the transmitter pen 30 is an ultrasonic transmitter 28.

A secondary output element 128, preferably an electromagnetic or infrared transmitter 128, transmits a secondary output signal 128 from the dual signal transmitter pen 30b to a secondary output signal receiver 120 (FIGS. 26,27) at a combined receiver location pod 118. In one embodiment, the secondary output signal receiver 120 is an infrared photodiode, Part No. SFH 205FA, manufactured by Siemens Microelectronics, Inc., of Cupertino, Calif.

Figure 28:
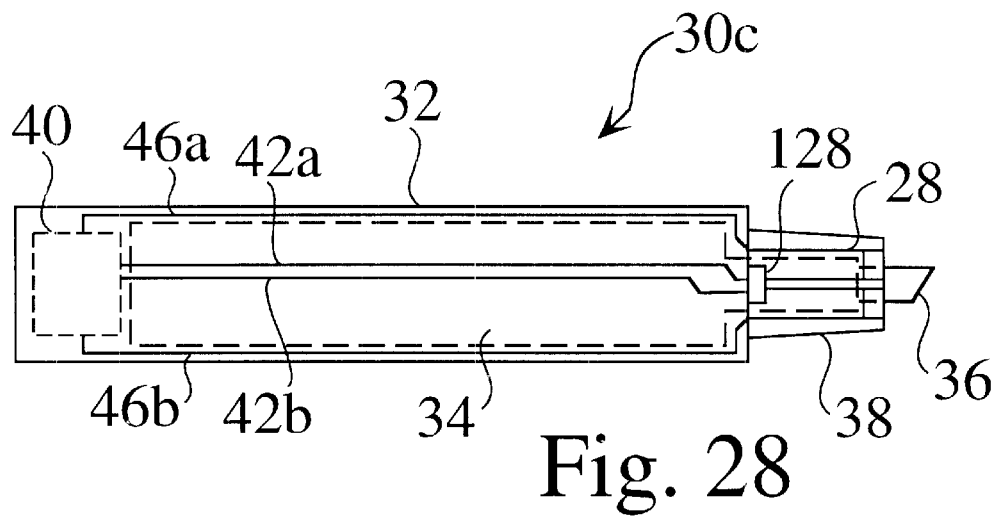
FIG. 28 is a partial cutaway view of a dual signal transmitter pen having a first output signal transducer and a second output signal transducer.

Transmitter Pen. FIG. 28 is a partial cutaway view of a dual-signal transmitter pen 30b having a primary output signal transducer 28 and a secondary output signal transducer 128. While the dual-signal transmitter pen 30b is described as a pen, it can be any sort of movable transmitter device. The transmitter circuitry 40, connected to the secondary output signal transducer 128 through leads 42a and 42b, excites the secondary output signal transducer 128, to produce a secondary output signal 116. The transmitter circuitry 40 is also connected to the primary output signal transducer 28 through leads 46a and 46b, and excites the primary output signal transducer 28, to produce a primary output signal 16. In one embodiment, the primary output signal 16 pulse train has a periodic frequency of 100 pulses per second.

Figure 29:
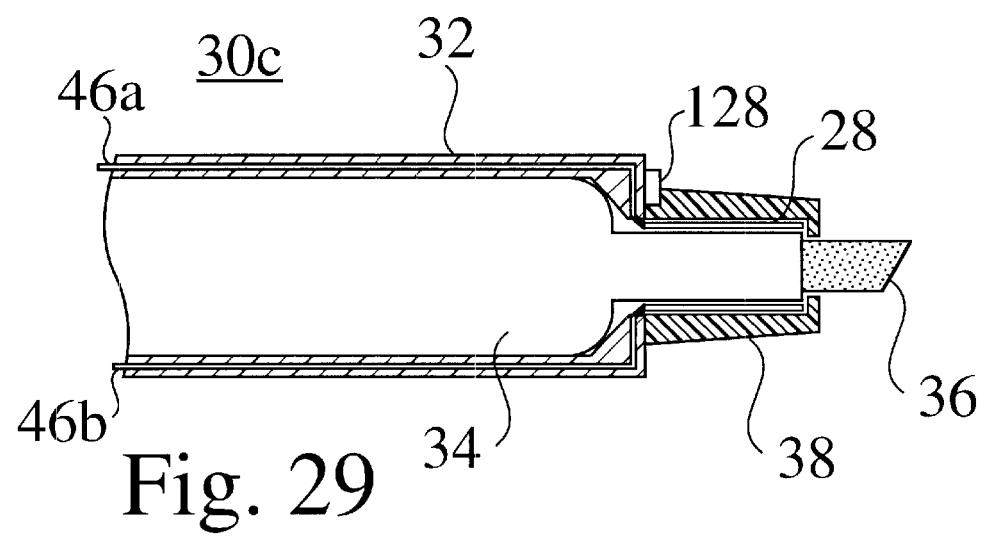
FIG. 29 is a detailed cutaway view of the pointing tip of a dual signal transmitter pen.
Figure 30:
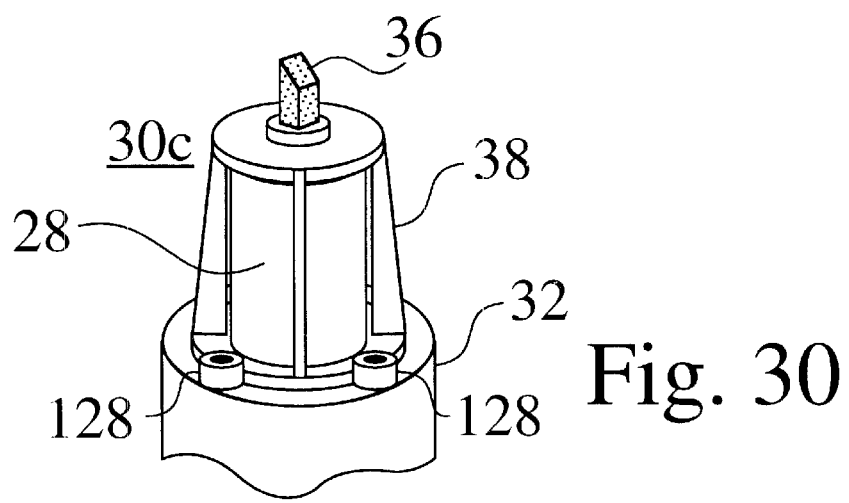
FIG. 30 is a partial perspective view of the pointing tip of a dual signal transmitter pen.

FIG. 29 is a detailed cutaway view of the pointing tip 36 of a dual-signal transmitter pen 30c having a first output signal transducer 28 and a secondary output signal transducer 128. FIG. 30 is a partial perspective view of the pointing tip 36 of a dual-signal transmitter pen 30c having a plurality of secondary output signal transducers 128 and a single piezoelectric primary output signal transducer 28. An optional finger guard 38 protects the secondary output signal transducers 128 and the primary output signal-transducer 28.

Figure 31:
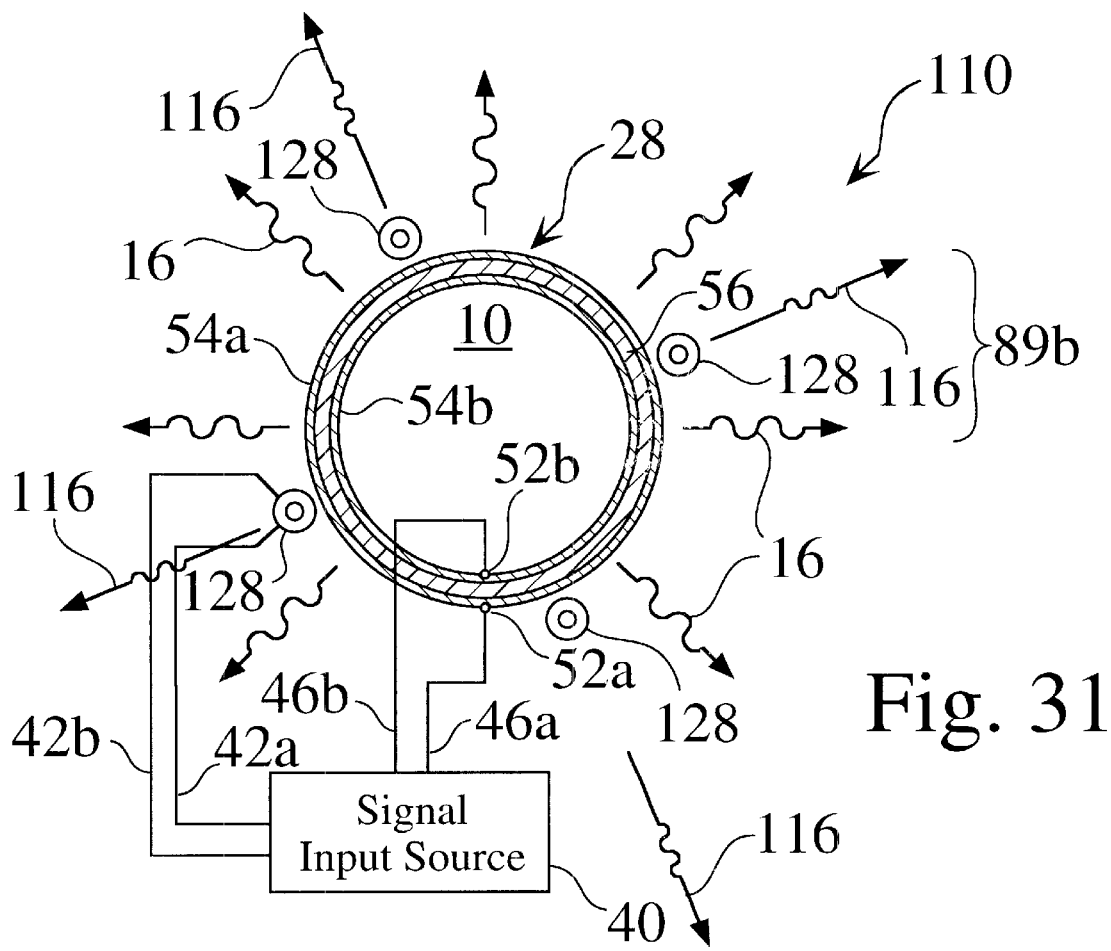
FIG. 31 is schematic view of the transmission of first output signal and a second output signal from a dual signal transmitter pen.
Figure 32:
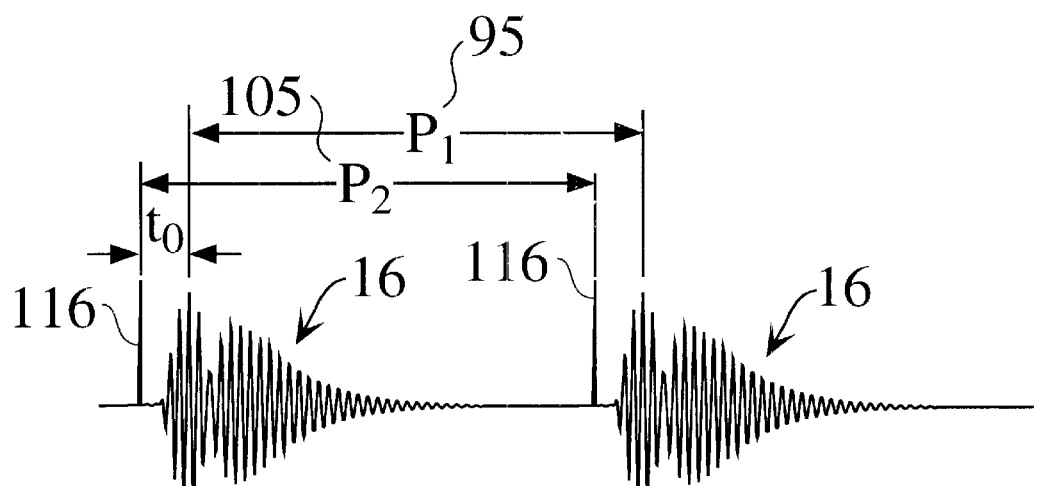
FIG. 32 shows a repeated dual output signal as it is sent from a dual signal transmitter pen.

Combined Output Signal Transmission. FIG. 31 is schematic view of the transmission a dual signal pulse train 89b from a dual signal transmitter pen 30c, comprising a repeated first output signal 16 having a period $P_1$ 95, and a repeated second output signal 116 having a period $P_2$ 105. FIG. 32 shows a repeated dual output signal pulse train 89b as it is sent from a dual signal transmitter pen 30c.

The first output signal 16, as described above for the single signal transmitter pen 30a, 30b is typically an ultrasound output signal 16, which is transmitted from one or more ultrasound transducers 28 located near the pointing tip 36 of the dual signal transmitter pen 30c. In one embodiment, the ultrasound transducer 28 is a cylindrical layered piezoelectric layer 56 surrounded by an outer conductive layer 54a and an inner conductive layer 54b, which is connected to the transmitter circuitry 40 by leads 46a and 46b and lead connections 52a and 52b. In another embodiment, the ultrasound transducer 28 used is Part No. AT/R 40-10P, manufactured by Nippon Ceramic Co. Ltd., of Tottori-Shi, Japan.

The second output signal 116 is typically an infrared output signal 116, which is transmitted from one or more infrared transducers 128 located near the pointing tip 36 of the dual signal transmitter pen 30c. In one embodiment, the infrared transducers 128 are Part No. SFH426, manufactured by Siemens Microelectronics, Inc., of Cupertino, Calif. While only one infrared transducer 128 is required, the use of more than one infrared transducer 128 is preferred, since it allows better line-of-sight transmission of the second output signal 116 to the dual signal receiver pod 118, such that the dual signal transmitter pen 30c can be rotated by the user.

Dual Signal Transmitter Pen Location Process. The dual signal transmitter pen location process, which uses a repeated transmission of a first output signal 16 and a second output signal 116 to locate the dual signal transmitter pen 30c relative to the writing area 14 of a surface 12, comprises the following steps:

i) sending a first output signal 16 having a first time of propagation from the dual signal transmitter pen 30c repeatedly to at least two first signal receivers 20a, 20b at a receiver location 18;

ii) sending a second output signal 116, having a time of propagation different from the time of propagation of the first output signal 16, from the dual signal transmitter pen 30b to a second signal receiver 120;

iii) determining the distance from the transmitter pen 30 to the receiver location 18, based on the time of arrival of the second output signal 116 at the second output signal receiver, and the time of arrival of the first output signal 16 to at least one of the two first output signal receivers 20a, 20b at the receiver location 18;

iv) determining the direction of arrival for the first output signal 16 between the dual signal transmitter pen 30c and the receiver location 18, based on the phase difference of the second output signal 16 at each of the second signal receivers 20a, 20b at the receiver location 18; and v) determining the location of the transmitter pen 30, based upon the determined distance from the transmitter pen 30 to the receiver location 18, and upon the determined direction of arrival of the first output signal 16 between of the dual signal transmitter pen 30b and the receiver location 18.

In most embodiments, the first output signal 16 is attenuated similarly as it arrives at each of the first output signal receivers 20a, 20b at the dual signal receiver location 118, which allows an accurate determined direction to be calculated, as described above for the single signal direction of arrival transmitter pen location system 10a, 10b, 10c. As in the single signal transmitter pen location system 10a, 10b, 10c, the dual signal transmitter pen location system 10g preferably stores 99 (FIG. 26) the received first output signals 16b received at each of the first signal receivers 20a, 20b, typically replacing the prior first output signals 16a, whereby the process is repeated for the next received first output signal 16b. In another preferred embodiment, precision is improved further, by storing more than one previous first output signal pulse 16, and by comparing the incoming first output signal 16b to a plurality of prior first output signals 16a.

Supplementary Information with the Dual Signal System. The output signal characteristics of the circuitry 40 and characteristic transmitter output signals 16, 116 can optionally communicate secondary information to the external receivers 20a, 20b, 120. Such supplementary information can include pen activation status, or pen types, such as different colored pens, or for pens of different widths, or even for calculated line types, such as for dashed lines. In systems where more than one user is writing on the writing area 14 of the surface 12, either sequentially of concurrently, the transmitter pens 30c can optionally communicate the designated user of each transmitter pen 30a.

Figure 33:
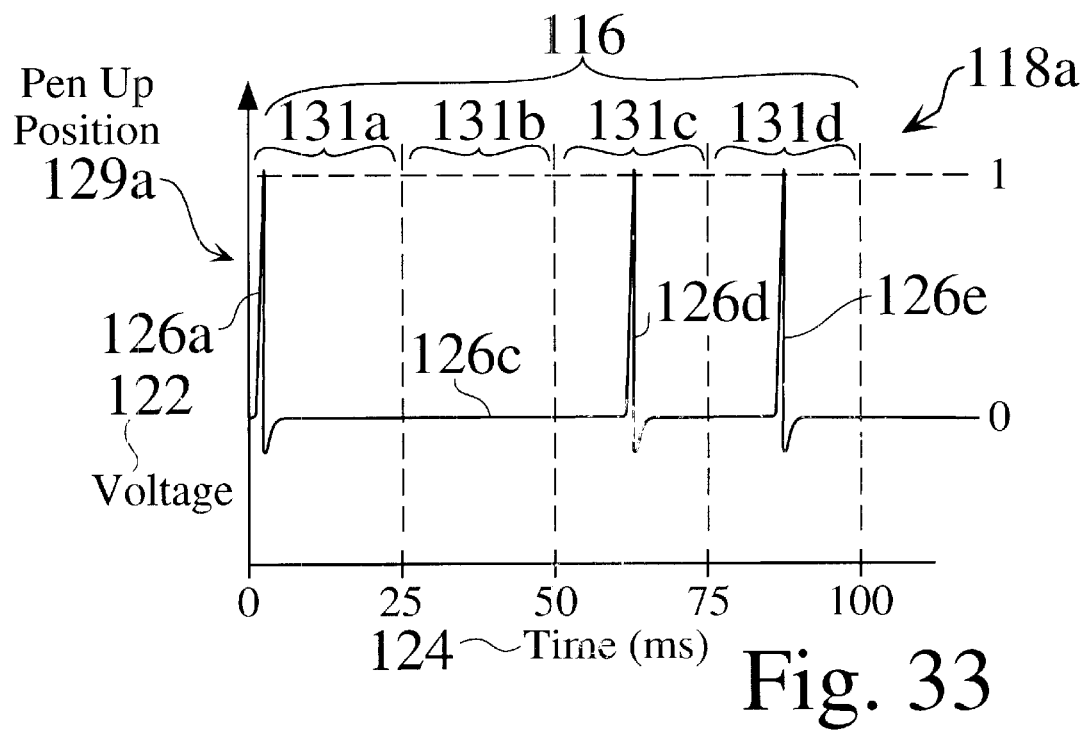
FIG. 33 shows a secondary output signal that includes encoded information which indicates a pen up position and supplementary information.
Figure 34:
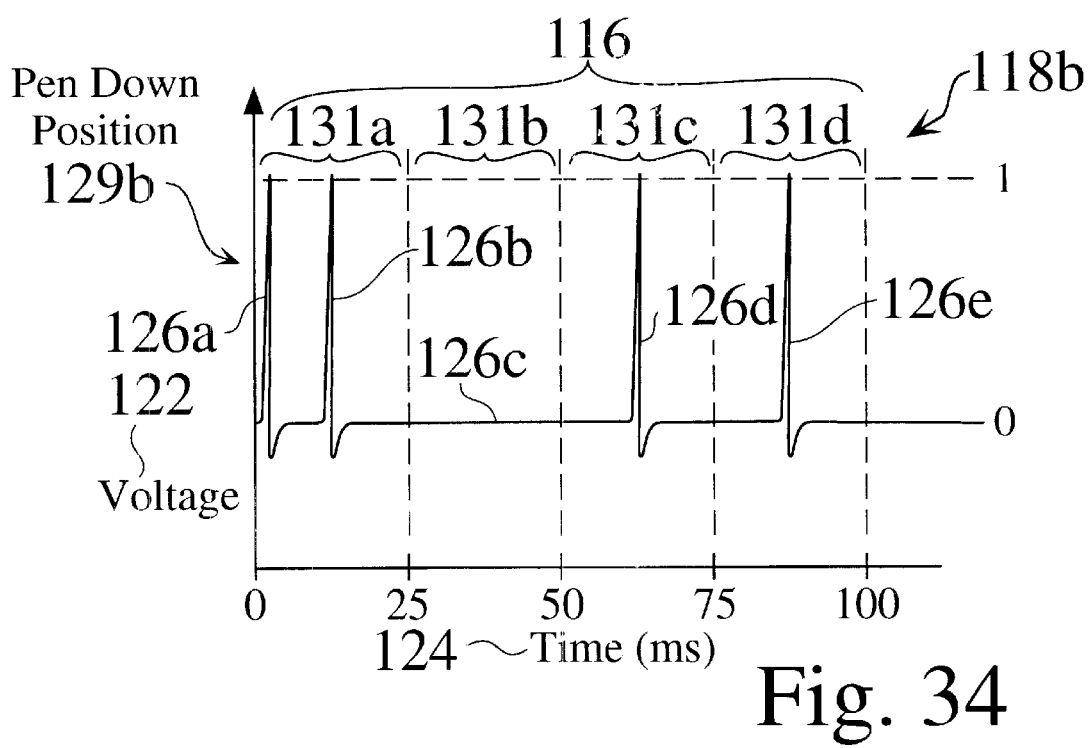
FIG. 34 shows a secondary output signal that includes encoded information which indicates a pen down position and supplementary information.

As discussed above for single signal transmitter pens 30a, 30b, the first output signal 16 can be modified to transmit supplementary information. In addition, the second output signal 116 can be modified to transmit supplementary information. FIG. 33 shows a second output signal 116 that includes encoded information 126 which indicates a pen up position 129a and supplementary information 126c–126e. FIG. 34 shows a second output signal 116 that includes encoded information 126 which indicates a pen down position 129b and supplementary information 126c–126e. FIG. 33 shows a secondary output signal 116 that indicates a pen up position 129a, using a single pulse 126a, and encoded supplementary information 126c–126e. FIG. 34 shows a secondary output signal 116 that indicates a pen down position 129b, using two pulses 126a and 126b, and encoded supplementary information 126c–126e. In FIG. 33, the secondary output signal 116 includes a single infrared pulse 126a within time window 131a to designate a "pen up" position 129a. In the same embodiment, the first output signal 116 includes two closely spaced infrared pulses 126a and 126b to designate a "pen down" position 129b, as shown in FIG. 34. The supplementary information 126c–126e provides bit information, which defines pen characteristics, such as designated color, width, line type, or user identification (e.g. author).

In the embodiment shown in FIG. 33 and FIG. 34, a timeline 124 is broken up into discreet windows 131a–131d, wherein the presence or absence of an infrared pulse 126c–126e indicates a binary "0" or "1", which can be combined with pulses within other windows 131a–131d along the timeline 124, to specify a pen color or type. In this manner, the presence of an infrared signal pulse 126 within a window 131 is identified as a bit within a number.

For example, in a three-bit number, three windows 131b–131d of 25–50 ms, 50–75 ms, and 75–100 ms are used to specify pen color. In this embodiment, the first window 131a of 0–25 ms is used to start the secondary output signal 116, in relation to the primary ultrasound signal 16 within a signal pulse train 89b.

In this embodiment, the three-bit number is chosen to represent pen color or type. Binary signals specify this supplementary information (e.g. 1=black; 2=red; 3=green; 4=blue). In the example shown in FIG. 33, the binary number for the 25–50 ms window 131b is a "0"; the binary number for the 50–75 ms window 131c is a "1"; and the binary number for the 75–100 ms window 131d is a "1". This yields a binary number of "011", or a "3", which specifies a pen color of green for a dual signal transmitter pen 30c in an "up" position 129a. The same "green" transmitter pen 30c is shown in the down position 129b in FIG. 34.

Although the transmitter pen location system 10 and its methods of use are described herein in connection with computer input systems, the techniques can be implemented for other control or display devices, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A transmitter location system, comprising:
a plurality of receiver locations each having a plurality of external receivers;
a time dependent output signal comprising a shaped pulse waveform having consistently identifiable features being transmitted repeatedly from a movable transmitter to each of the plurality of external receivers;
means for determining a relative time of arrival for the time dependent output signal to reach each of the plurality of external receivers at each of the receiver locations, the determination comprising a comparison of the consistently identifiable features of the time dependent output signal at each of the external receivers at each of the plurality of receiver locations;
means for defining a direction between the movable transmitter and each of the plurality of receiver locations, the defined direction based upon the determined relative time of arrival for the time dependent signal to reach each of the plurality of external receivers at each of the receiver locations; and
means for determining location of the movable transmitter, based upon the direction from the movable transmitter to each of the plurality of receivers.

2. The transmitter location system of claim 1, wherein the output signal is an ultrasound signal.

3. The transmitter location system of claim 1, wherein the output signal contains encoded information regarding the movable transmitter.

4. The transmitter location system of claim 3, wherein the encoded information includes a determined color of the movable transmitter.

5. The transmitter location system of claim 3, wherein the encoded information includes a determined line width of the movable transmitter.

6. The transmitter location system of claim 3, wherein the encoded information includes a determined line style of the movable transmitter.

7. The transmitter location system of claim 3, wherein the encoded information includes a user identification of the movable transmitter.

8. A location system, comprising:
a surface having a writing area, a plurality of receiver locations each having a plurality of external receivers, and a signal processor;

a movable device adapted to be located within the writing area of the surface, the movable device adapted to send an output signal comprising a shaped pulse waveform having consistently identifiable features repeatedly from the movable device to each of the plurality of receiver locations; and a signal processor connected to each of the plurality of external receivers, which processes the output signal to determine a phase difference of the output signal between each of the plurality of external receivers at each of the plurality of receiver locations, the determination comprising a comparison of the consistently identifiable features of the output signal at each of the external receivers at each of the plurality of receiver locations, to calculate direction of the movable device to each of the receiver locations based upon the determined phase difference at each of the plurality of receiver locations, and to determine the location of the movable device, based upon the calculated direction from the portable transmitter to each of the plurality of receiver locations.

9. The transmitter location system of claim 8, wherein the output signal is an ultrasonic output signal.

10. The location system of claim 8, wherein the output signal has a first signal state and a second signal state.

11. The location system of claim 10, wherein the movable device is located in a transmitter pen, wherein the first signal state corresponds to a pen up position of the transmitter pen, and wherein the second signal state corresponds to a pen down position of the transmitter pen.

12. The location system of claim 8, wherein the output signal contains encoded information regarding the movable device.

13. The location system of claim 12, wherein the encoded information includes a determined color of the movable device.

14. The location system of claim 12, wherein the encoded information includes a determined line width of the movable device.

15. The location system of claim 12, wherein the encoded information includes a determined line style of the movable device.

16. The location system of claim 12, wherein the encoded information includes a user identification of the movable device.

17. A process for calculating a location of a transmitter pen relative to a writing area of a surface, the process comprising:

sending an output signal comprising a shaped pulse waveform having consistently identifiable features from the transmitter pen to a plurality of receiver locations, each of the receiver locations having a plurality of external receivers;

determining a phase difference of the output signal between each of the plurality of external receivers at each of the plurality of receiver locations, the determination comprising a comparison of the consistently identifiable features of the output signal at each of the external receivers at each of the plurality of receiver locations;

determining a direction from the transmitter pen to each of the plurality of receiver locations based on the determined phase difference of the output signal at each of the receiver locations; and determining the location of the transmitter pen based upon the determined direction from the transmitter pen to each of the plurality of receiver locations.

18. The process of claim 17, wherein the output signal is an ultrasonic output signal.

19. The process of claim 17, wherein the output signal has a first signal state and a second signal state.

20. The process of claim 19, wherein the first signal state corresponds to a pen up position of the transmitter pen, and wherein the second signal state corresponds to a pen down position of the transmitter pen.

21. The process of claim 17, wherein the output signal contains encoded information regarding the transmitter pen.

22. The process of claim 21, wherein the encoded information includes a determined color of the transmitter pen.

23. The process of claim 21, wherein the encoded information includes a determined line width of the transmitter pen.

24. The process of claim 21, wherein the encoded information includes a determined line style of the transmitter pen.

25. The process of claim 21, wherein the encoded information includes a user identification of the transmitter pen.

26. A transmitter location system, comprising:

at least three external receivers;

a time dependent output signal comprising a shaped pulse waveform having consistently identifiable features being transmitted repeatedly from a movable transmitter to each of the external receivers, wherein time to reach each of the external receivers defines a distance between the movable transmitter and each of the external receivers; and means for determining location of the movable transmitter, based upon the distance between the movable transmitter and each of the external receivers, and a comparison of the consistently identifiable features between the output signal and a stored prior time dependent output signal.

27. The transmitter location system of claim 26, wherein the time dependent output signal is an ultrasound signal.

28. The transmitter location system of claim 26, wherein the time dependent output signal contains encoded information regarding the movable transmitter.

29. The transmitter location system of claim 28, wherein the encoded information includes a determined color of the movable transmitter.

30. The transmitter location system of claim 28, wherein the encoded information includes a determined line width of the movable transmitter.

31. The transmitter location system of claim 28, wherein the encoded information includes a determined line style of the movable transmitter.

32. The transmitter location system of claim 28, wherein the encoded information includes a user identification of the movable transmitter.

33. A location system, comprising:

a surface having a writing area, at least three external receivers, and a signal processor;

a movable device adapted to be located within the writing area of the surface, the movable device adapted to send a time dependent output signal comprising a shaped pulse waveform having consistently identifiable features repeatedly from the movable device to each of the external receivers; and a signal processor connected to each of the external receivers, the signal processor determining distance between the movable device and the external receivers based on time of arrival of the output signal to the external receivers and a comparison of the consistently identifiable features between the output signal and a prior time dependent output signal, and determining the location of the movable device, based upon the calculated distance between the movable device and each of the external receivers.

34. The location system of claim 33, wherein the output signal is an ultrasonic output signal.

35. The location system of claim 33, wherein the output signal has a first signal state and a second signal state.

36. The location system of claim 35, wherein the movable device is located in a transmitter pen, wherein the first signal state corresponds to a pen up position of the transmitter pen, and wherein the second signal state corresponds to a pen down position of the transmitter pen.

37. The location system of claim 33, wherein the output signal contains encoded information regarding the movable device.

38. The location system of claim 37, wherein the encoded information includes a determined color of the movable device.

39. The location system of claim 37, wherein the encoded information includes a determined line width of the movable device.

40. The location system of claim 37, wherein the encoded information includes a determined line style of the movable device.

41. The location system of claim 37, wherein the encoded information includes a user identification of the movable device.

42. A process for calculating a location of a transmitter pen relative to a writing area of a surface, the process comprising:
    sending a time-dependent output signal comprising a shaped pulse waveform having consistently identifiable features from the transmitter pen to at least three external receivers;
    comparing the consistently identifiable features of the output signal received at each of the external receivers to the consistently identifiable features of a stored prior second output signal received at each of the external receivers to determine a time of arrival of the output signal at each of the external receivers;
    determining a distance from the transmitter pen to each of the external receivers based on the determined time of arrival of the output signal at each of the external receivers; and
    determining the location of the transmitter pen based upon the determined distance from the transmitter pen to each of the external receivers.

43. The process of claim 42, wherein the output signal is an ultrasonic output signal.

44. The process of claim 42, wherein the output signal has a first signal state and a second signal state.

45. The process of claim 44, wherein the first signal state corresponds to a pen up position of the transmitter pen, and wherein the second signal state corresponds to a pen down position of the transmitter pen.

46. The process of claim 42, wherein the output signal contains encoded information regarding the transmitter pen.

47. The process of claim 46, wherein the encoded information includes a determined color of the transmitter pen.

48. The process of claim 46, wherein the encoded information includes a determined line width of the transmitter pen.

49. The process of claim 46, wherein the encoded information includes a determined line style of the transmitter pen.

50. The process of claim 46, wherein the encoded information includes a user identification of the transmitter pen.

51. A location system between a movable device and a receiver location, comprising:
    a first output signal having a first speed of propagation, the first output signal being transmitted repeatedly from the movable device to a plurality of first signal receivers at the receiver location, wherein time to reach each of the first signal receivers is dependent on a distance between the movable device and each of the plurality of first signal receivers;
    a second output signal having a second speed of propagation different from the first speed of propagation of the first output signal, the second output signal being transmitted repeatedly from the movable device to a second signal receiver at the receiver location; and
    means for determining location of the movable device, using the first output signal received at the plurality of first signal receivers to determine a direction of arrival of the first signal to the receiver location, and using the second output signal to calculate distance from the movable device to the receiver location.

52. The location system of claim 51, wherein the received first output signal is compared to a stored prior first output signal.

53. The location system of claim 51, wherein the means for determining location of the movable device uses a stored prior transmitted first output signal to calculate distance from the movable transmitter to each of the plurality of first signal receivers.

54. The location system of claim 51, wherein the means for determining location of the movable device is programmable.

55. The location system of claim 51, wherein the first output signal includes a repeatable feature, and wherein the means for determining location of the movable device compares the repeatable feature of the first output signal and a stored prior transmitted first output signal.

56. The location system of claim 51, wherein the means for determining location of the movable device normalizes the first output signal and a stored prior transmitted first output signal.

57. The location system of claim 51, wherein the second output signal is an electromagnetic output signal.

58. The location system of claim 51, wherein the second output signal is an infrared output signal.

59. The location system of claim 51, wherein the second output signal has a first signal state and a second signal state.

60. The location system of claim 59, wherein the movable device is a transmitter pen, wherein the first signal state corresponds to a pen up position of the transmitter pen, and wherein the second signal state corresponds to a pen down position of the transmitter pen.

61. The location system of claim 51, wherein the second output signal contains encoded information regarding the movable device.

62. The location system of claim 61, wherein the encoded information includes a determined color of the movable device.

63. The location system of claim 61, wherein the encoded information includes a determined line width of the movable device.

64. The location system of claim 61, wherein the encoded information includes a determined line style of the movable device.

65. The location system of claim 61, wherein the encoded information includes a user identification of the movable device.

66. The location system of claim 51, wherein the first output signal is an ultrasound transmission signal.

67. The location system of claim 51, further comprising:
a wireless connection between the receiver location and the means for determining location of the movable device.

68. The location system of claim 51, further comprising:
a defined functional area, whereby the movable device is selectively activated to send functions to a computer.

69. The location system of claim 51, wherein the first output signal contains encoded information regarding the movable device.

70. The location system of claim 69, wherein the encoded information includes a determined color of the movable device.

71. The location system of claim 69, wherein the encoded information includes a determined line width of the movable device.

72. The location system of claim 69, wherein the encoded information includes a determined line style of the movable device.

73. The location system of claim 69, wherein the encoded information includes a user identification of the movable device.

74. A process for calculating a location a movable device relative to a surface, the process comprising:
repeatedly sending a first output signal having a first speed of propagation from the movable device to at least two first signal receivers at a receiver location;
repeatedly sending a second output signal having a second speed of propagation different from the first speed of propagation of the first output signal from the movable device to a second signal receiver at the receiver location;
determining a distance from the movable device to the receiver location, based on a time of arrival of the second output signal at the second signal receiver, and a time of arrival of the first output signal to at least one of the first signal receivers at the receiver location;
determining a direction of arrival for the first output signal between the movable device and the receiver location, based on the time of arrival of the second output signal at each of the second signal receivers at the receiver location; and
calculating the location of the movable device, based upon the determined distance from the movable device to the receiver location, and upon the determined direction of arrival of the first output signal between the movable device and the receiver location.

75. The process of claim 74, further comprising the step of:
comparing the first output signal to a prior first output signal.

76. The process of claim 75, wherein the step of comparing compares the first output signal received at each of the plurality of first signal receivers to a plurality of stored prior first output signals received at each of the plurality of first signal receivers to calculate distance from the movable device to each of the plurality of first signal receivers.

77. The process of claim 75, wherein the step of comparing the first output signal and the stored prior first output signal is programmable.

78. The process of claim 75, wherein the first output signal and the stored prior said first output signal include a repeatable feature, and wherein the step of comparing compares the repeatable feature of the first output signal and the stored prior first output signal.

79. The process of claim 74, wherein the surface is a white board.

80. The process of claim 74, wherein the second output signal is an electromagnetic output signal.

81. The process of claim 74, wherein the second output signal is an infrared output signal.

82. The process of claim 74, wherein the second output signal has a first signal state and a second signal state.

83. The process of claim 82, wherein the first signal state corresponds to a pen up position of the movable device, and wherein the second signal state corresponds to a pen down position of the movable device.

84. The process of claim 74, wherein the second output signal contains encoded information regarding the movable device.

85. The process of claim 84, wherein the encoded information includes a determined color of the movable device.

86. The process of claim 84, wherein the encoded information includes a determined line width of the movable device.

87. The process of claim 84, wherein the encoded information includes a determined line style of the movable device.

88. The process of claim 84, wherein the encoded information includes a user identification of the movable device.

89. The process of claim 84, wherein the first output signal is an ultrasound transmission signal.

90. The process of claim 74, further comprising the step of:
providing a wireless connection between the receiver location and a signal processor.

91. The process of claim 74, further comprising the step of:
defining a functional area on the surface, whereby the movable device is selectively activated to send information to a computer.

92. The process of claim 74, wherein the first output signal contains encoded information regarding the movable device.

93. The process of claim 92, wherein the encoded information includes a determined color of the movable device.

94. The process of claim 92, wherein the encoded information includes a determined line width of the movable device.

95. The process of claim 92, wherein the encoded information includes a determined line style of the movable device.

96. The process of claim 92, wherein the encoded information includes a user identification of the movable device.

* * * * *